United States Patent
Moriwaki et al.

(10) Patent No.: US 9,268,346 B2
(45) Date of Patent: Feb. 23, 2016

(54) REACTOR WITH ACCURATE TEMPERATURE CONTROL

(75) Inventors: Toshiki Moriwaki, Kanagawa (JP); Nobuhiro Kanai, Kanagawa (JP); Takanori Anaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 12/422,575

(22) Filed: Apr. 13, 2009

(65) Prior Publication Data
US 2009/0258413 A1   Oct. 15, 2009

(30) Foreign Application Priority Data
Apr. 15, 2008   (JP) ................ 2008-105840

(51) Int. Cl.
*G05D 23/19* (2006.01)
*B01L 7/00* (2006.01)

(52) U.S. Cl.
CPC ............. *G05D 23/1935* (2013.01); *B01L 7/52* (2013.01); *B01L 2200/147* (2013.01); *B01L 2300/0654* (2013.01); *B01L 2300/0819* (2013.01); *B01L 2300/1822* (2013.01); *B01L 2300/1827* (2013.01)

(58) Field of Classification Search
CPC ............. B01L 7/52; B01L 2200/147; B01L 2300/0654; B01L 2300/0819; B01L 2300/1822; B01L 2300/1827; G05D 23/1935
USPC ................ 435/303.1; 422/129, 146, 188, 193
See application file for complete search history.

(56) References Cited

U.S. PATENT DOCUMENTS

| | | | |
|---|---|---|---|
| 4,450,470 A * | 5/1984 | Shiba | 257/49 |
| 5,356,484 A * | 10/1994 | Yater et al. | 136/200 |
| 5,525,300 A * | 6/1996 | Danssaert et al. | 422/552 |
| 5,645,801 A | 7/1997 | Bouma et al. | |
| 5,819,842 A | 10/1998 | Potter et al. | |
| 6,504,226 B1 | 1/2003 | Bryant | |
| 6,756,223 B2 * | 6/2004 | Roberts et al. | 435/287.2 |
| 6,864,140 B2 | 3/2005 | Bryant | |
| 6,875,602 B2 | 4/2005 | Gutierrez | |
| 7,056,795 B2 | 6/2006 | Bryant | |
| 2003/0008286 A1 | 1/2003 | Zou et al. | |
| 2003/0116552 A1 | 6/2003 | Santoruvo et al. | |
| 2004/0056915 A1 | 3/2004 | Miyazawa | |
| 2006/0073491 A1 * | 4/2006 | Joseph et al. | 435/6 |
| 2006/0160205 A1 | 7/2006 | Blackburn et al. | |
| 2006/0281143 A1 | 12/2006 | Liu et al. | |
| 2007/0184548 A1 * | 8/2007 | Tan et al. | 435/303.1 |
| 2007/0284360 A1 | 12/2007 | Santoruvo et al. | |
| 2008/0220509 A1 * | 9/2008 | Segawa et al. | 435/287.2 |
| 2009/0258412 A1 | 10/2009 | Moriwaki et al. | |

FOREIGN PATENT DOCUMENTS

| | | |
|---|---|---|
| JP | 10-117764 A | 5/1998 |
| JP | 2000-271474 A | 10/2000 |
| JP | 2003-511221 A | 3/2003 |
| JP | 2003-180328 A | 7/2003 |
| JP | 2003-180350 A | 7/2003 |
| JP | 2005-519381 A | 6/2005 |
| JP | 2006-238759 A | 9/2006 |
| JP | 2006-271347 A | 10/2006 |
| WO | WO 2005/054458 A1 | 6/2005 |

* cited by examiner

*Primary Examiner* — Michael Marcheschi
*Assistant Examiner* — Gautam Prakash
(74) *Attorney, Agent, or Firm* — Wolf, Greenfield & Sacks, P.C.

(57) ABSTRACT

Disclosed herein is a reactor including, a plurality of reaction regions, and a plurality of heaters, each arranged in each of the reaction regions, wherein the heater including a semiconductor heat generating element and a semiconductor temperature detecting element and being capable of independent temperature control, and the temperature detecting element having a heat conduction region of metal thin film in its surrounding region.

9 Claims, 36 Drawing Sheets

F I G . 4
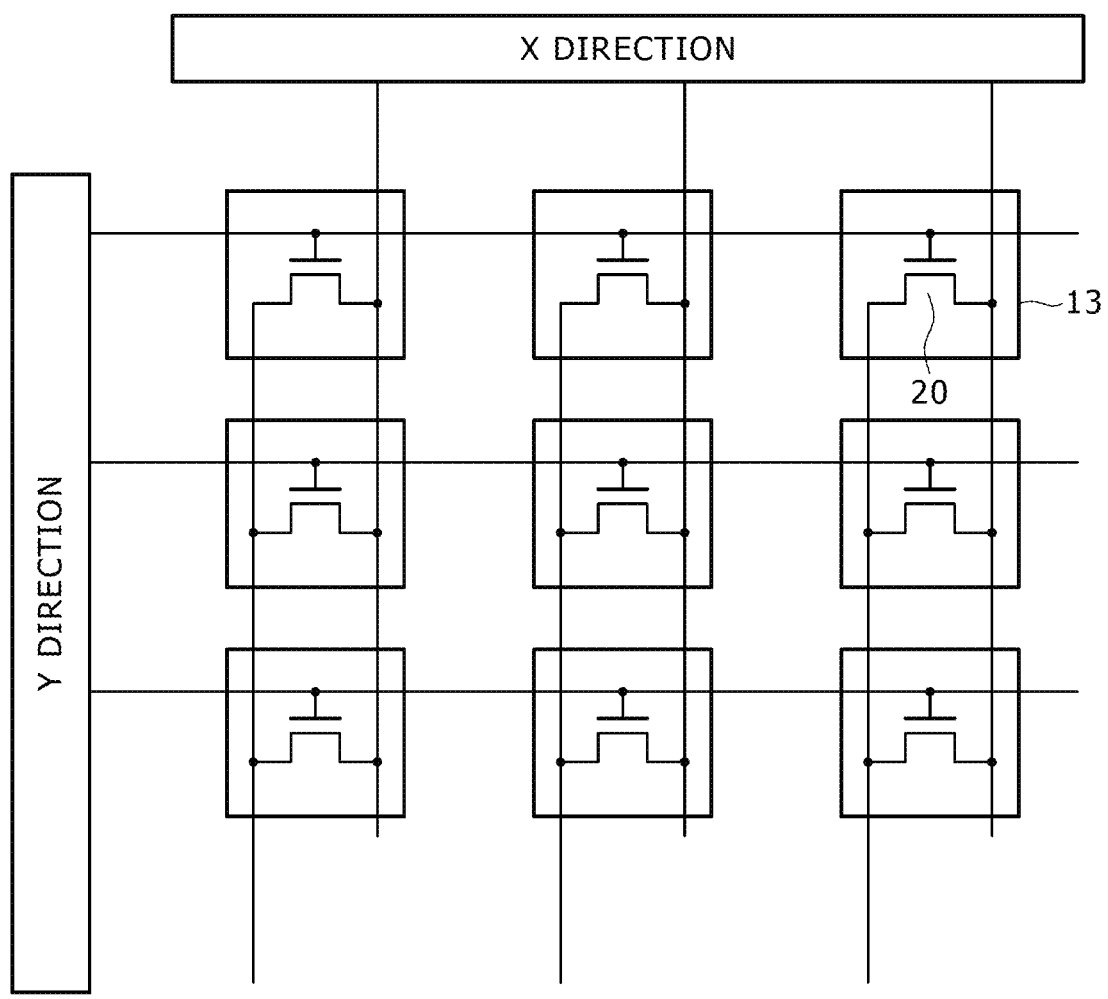

FIG.33

| SCANNING LINE SSL | T211 | T212 | T311 | T312 | D211 |
|---|---|---|---|---|---|
| HIGH LEVEL | ON STATE | ON STATE | OFF STATE | OFF STATE | TEMPERATURE DETECTION |
| LOW LEVEL | OFF STATE | OFF STATE | ON STATE | ON STATE | FLUORESCENCE DETECTION |

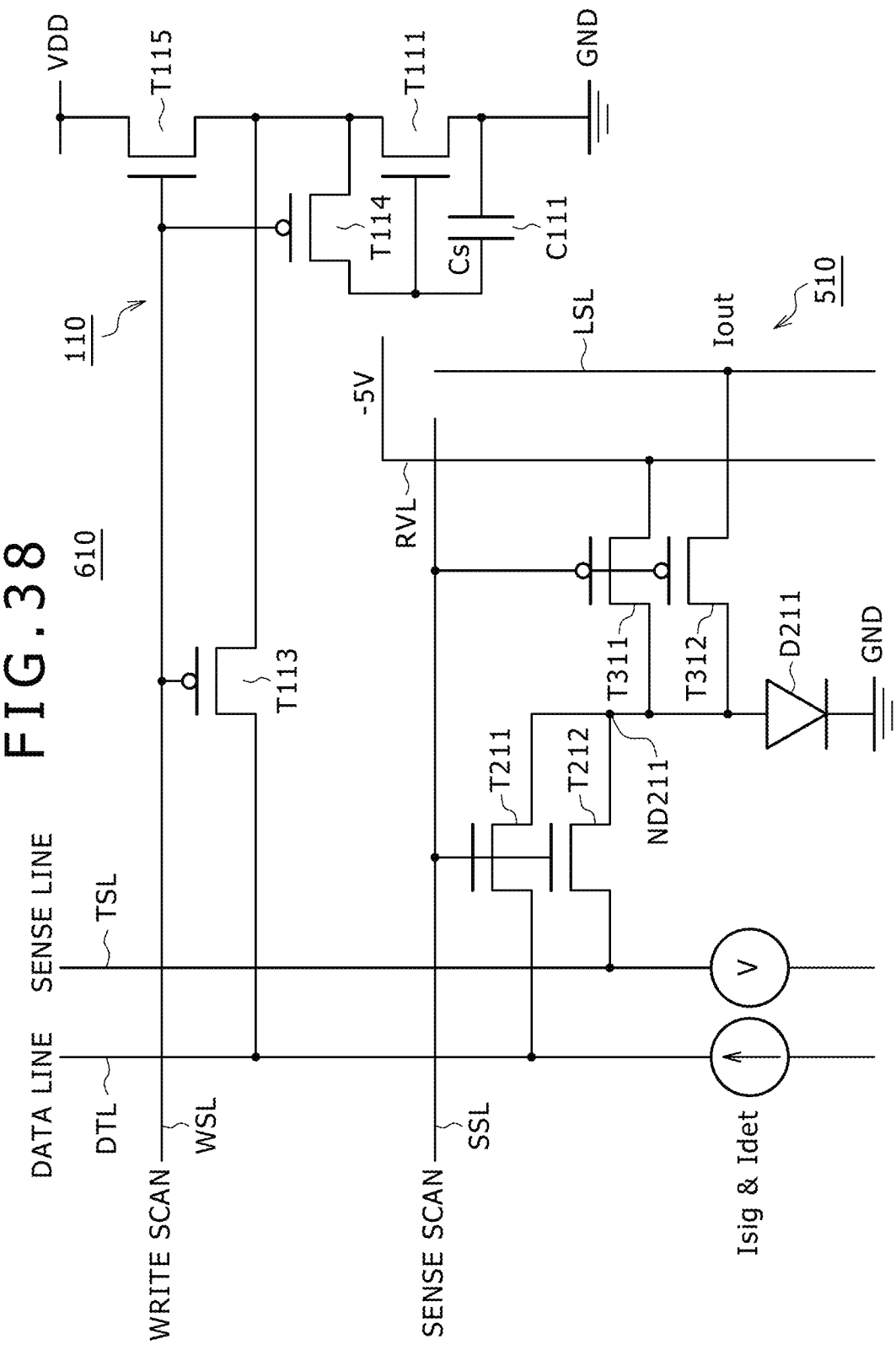

REACTOR WITH ACCURATE TEMPERATURE CONTROL

BACKGROUND OF THE INVENTION

1. Field of the Invention

The present invention relates to a reactor to be applied to PCR for nucleic acid amplification and, more particularly, to a reactor capable of accurate temperature control.

2. Description of the Related Art

In the case where it is necessary to control reactions according to temperature conditions, it is desirable to be able to control the temperature conditions more accurately. Capability of accurate temperature control is desirable for any reactors for liquids, solids, and gases. This holds true in the technical field of gene analysis.

One example of such cases is PCR (polymerase chain reaction) for nucleic acid amplification. PCR may be regarded as the standard process for quantitative analysis of nucleic acid in trace amounts.

PCR is designed to repeat the cycle of amplification, which consists of "thermal denaturation→annealing with primer→polymerase extension reaction," thereby amplifying the amount of DNA several hundred thousand times.

The PCR amplified product obtained in this manner can be monitored in real time for quantitative analysis of nucleic acid in trace amounts.

However, PCR requires that the amplification cycle be accurately controlled. To this end, a highly accurate temperature control is essential.

Inadequate temperature control will lead to amplification of unnecessary DNA sequence or prevent amplification.

Thus, the above-mentioned reactor needs capability of highly accurate temperature control as a reactor. Technologies relating to this are disclosed in Japanese Patent Laid-open No. 2003-298068 and Japanese Patent Laid-open No. 2004-025426.

Control of heat generation in a minute region is accomplished by means of semiconductor devices. Semiconductor devices can be applied to heater elements arranged in matrix form. The technology relating to matrix arrangement is disclosed in Japanese Patent Laid-open No. 2003-180328.

SUMMARY OF THE INVENTION

The conventional way of temperature control with semiconductor devices for the reactor proposed past suffers the following disadvantages.

The semiconductor heating element 1 and the temperature detecting element 2 are composed of gate, source, drain, and their wiring, and hence they take on a rectangular shape (in plan view), as shown in FIG. 1.

If the semiconductor heating element 1 and the temperature detecting element 2 are formed in the same cell, they are arranged as shown in FIG. 2. Incidentally, FIG. 2 also shows the surface temperature profile.

The semiconductor heating element 1 generates heat, which diffuses on the surface and reaches the temperature detecting element 2. The surface temperature decreases in going from the semiconductor heating element 1 to the temperature detecting element 2. Thus, the temperature of the semiconductor heating element 1 cannot be accurately measured by the temperature detecting element 2.

It is an embodiment of the present invention to provide a reactor which is capable of accurate temperature detection for the semiconductor heating element and is also capable of accurate temperature control.

An embodiment of the present invention resides in a reactor which includes a plurality of reaction regions and a plurality of heaters, each arranged in each of the reaction regions, the heater being composed of a semiconductor heat generating element and a semiconductor temperature detecting element and being capable of independent temperature control, and the temperature detecting element having a heat conduction region of metal thin film in its surrounding region.

The semiconductor temperature detecting element should preferably be a diode or a PIN diode.

The semiconductor heat generating element should preferably be a thin film transistor.

The metal thin film should preferably be a wiring layer.

The reaction region should preferably be a PCR region for nucleic acid amplification.

The reactor should preferably include a fluorescence detector that detects fluorescence induced by irradiation with exciting rays.

The reactor according to the embodiment of the present invention has a semiconductor temperature detecting element which is surrounded by a metal thin film to be heated by diffused heat from the semiconductor heat generating element, so that it is capable of accurate temperature detection.

According to the embodiment of the present invention, it is possible to accurately detect the temperature of the semiconductor heat generating element and to accurately control the temperature.

BRIEF DESCRIPTION OF THE DRAWINGS

FIG. 4 is a schematic diagram showing the structure of the heating part in the reactor according to the embodiment of the present invention;

FIG. 33 shows how the temperature fluorescence detecting unit according to the embodiment of the present invention performs temperature detection and fluorescence detection depending on whether the transistors as switches turn on and off;

FIG. 38 is a circuit diagram showing the structure of the heater temperature fluorescence detecting unit according to the embodiment of the present invention.

DETAILED DESCRIPTION OF THE PREFERRED EMBODIMENTS

The embodiments of the present invention will be described below with reference to the accompanying drawings.

The embodiments illustrated in the accompanying drawings represent merely some typical ones of the present invention, and they should not be construed to restrict the scope of the present invention.

The drawings used hereunder show the structure of the apparatus in a simplified manner for the convenience of illustration.

Figure 1:
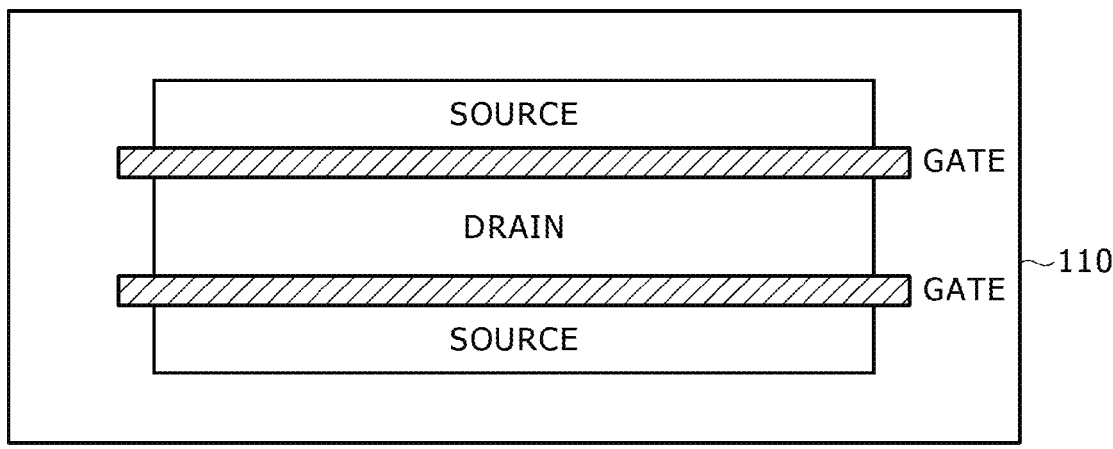
FIG. 1 is a schematic diagram showing an example of the pattern in the reactor which employs a semiconductor element as a heat generating element.
Figure 2:
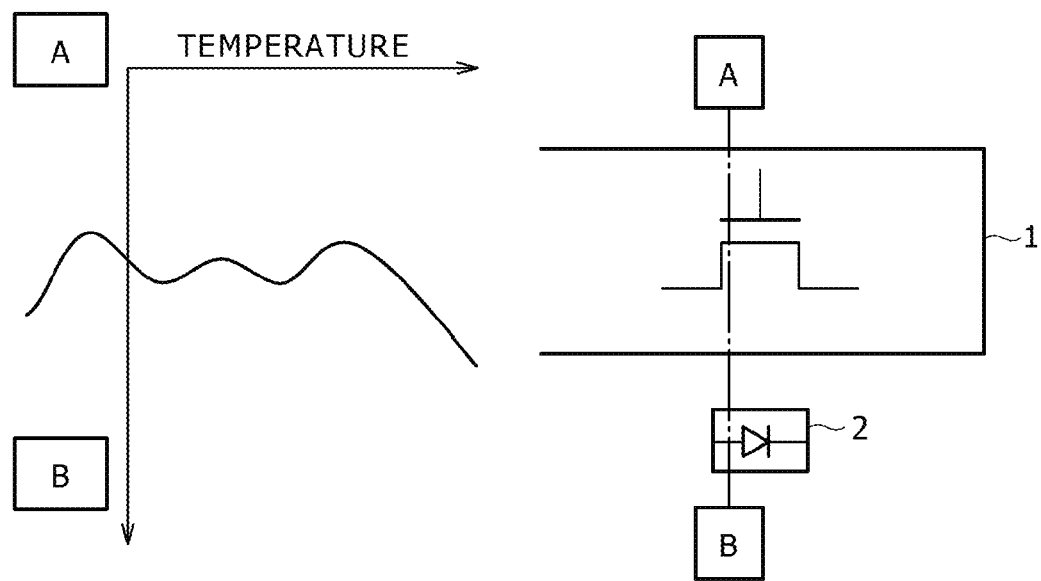
FIG. 2 is a schematic diagram showing the arrangement of the semiconductor heat generating element and the temperature detecting element and a schematic diagram showing the surface temperature profile.
Figure 3:
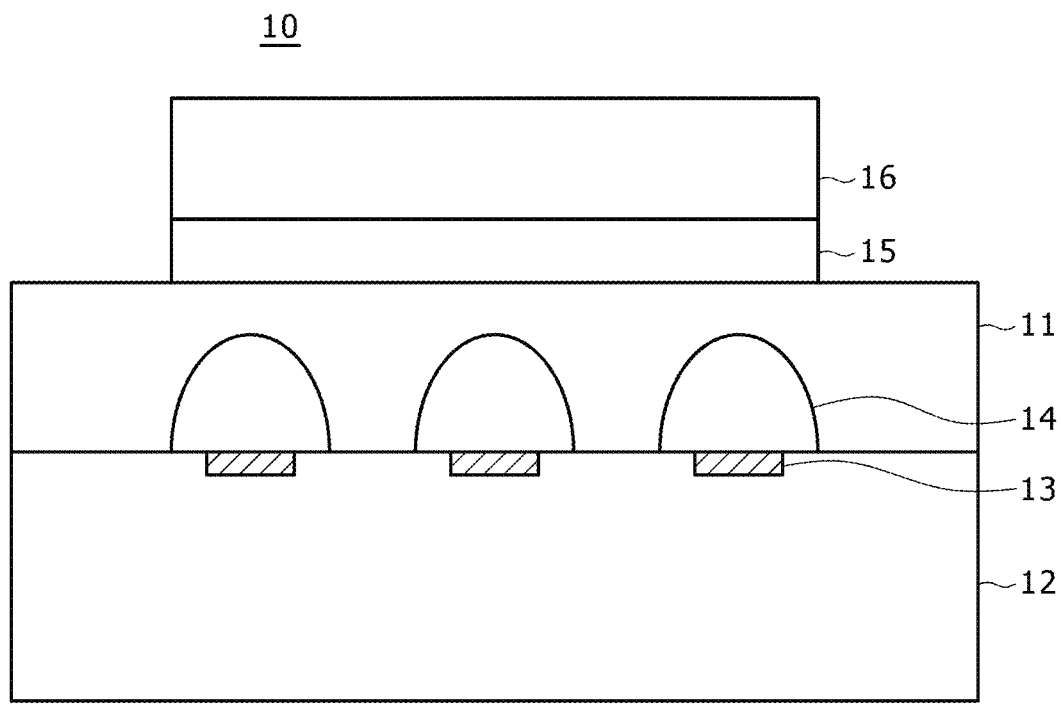
FIG. 3 is a conceptual diagram showing the reactor according to an embodiment of the present invention.

FIG. 3 is a conceptual diagram showing the reactor according to the embodiment of the present invention.

The reactor shown herein may be properly changed in size and layer structure according to objects. The shape and structure of the reactor 10 may be designed or modified within the scope of the present invention.

As shown in FIG. 3, the reactor 10 according to an embodiment of the present invention is composed of a well substrate 11, a heater substrate 12, a heating part 13, a reaction region 14 formed in the well substrate 11, a cooling part 15, and a radiator 16.

As explained above, the reactor 10 has the well substrate 11, which has a plurality of reaction regions 14, and the heating part 13, which heats the reaction region 14.

The cooling part 15 is a Peltier element which absorbs heat. Absorbed heat is released by the radiator 16.

The reaction regions 14 are intended for reactions under different conditions. Therefore, they permit a comprehensive analysis if reaction conditions are established individually for them.

FIG. 4 is a schematic diagram showing the structure of the heating part in the reactor according to the embodiment of the present invention.

According to this embodiment, the reactor 10 has the reaction regions 14 arranged in a matrix pattern and each reaction region is provided with the heating part 13. All of the heating part 13 are arranged in a matrix pattern in the X and Y directions, as shown in FIG. 4.

This structure permits the semiconductor heat generating elements 20 to be controlled collectively.

Figure 5:
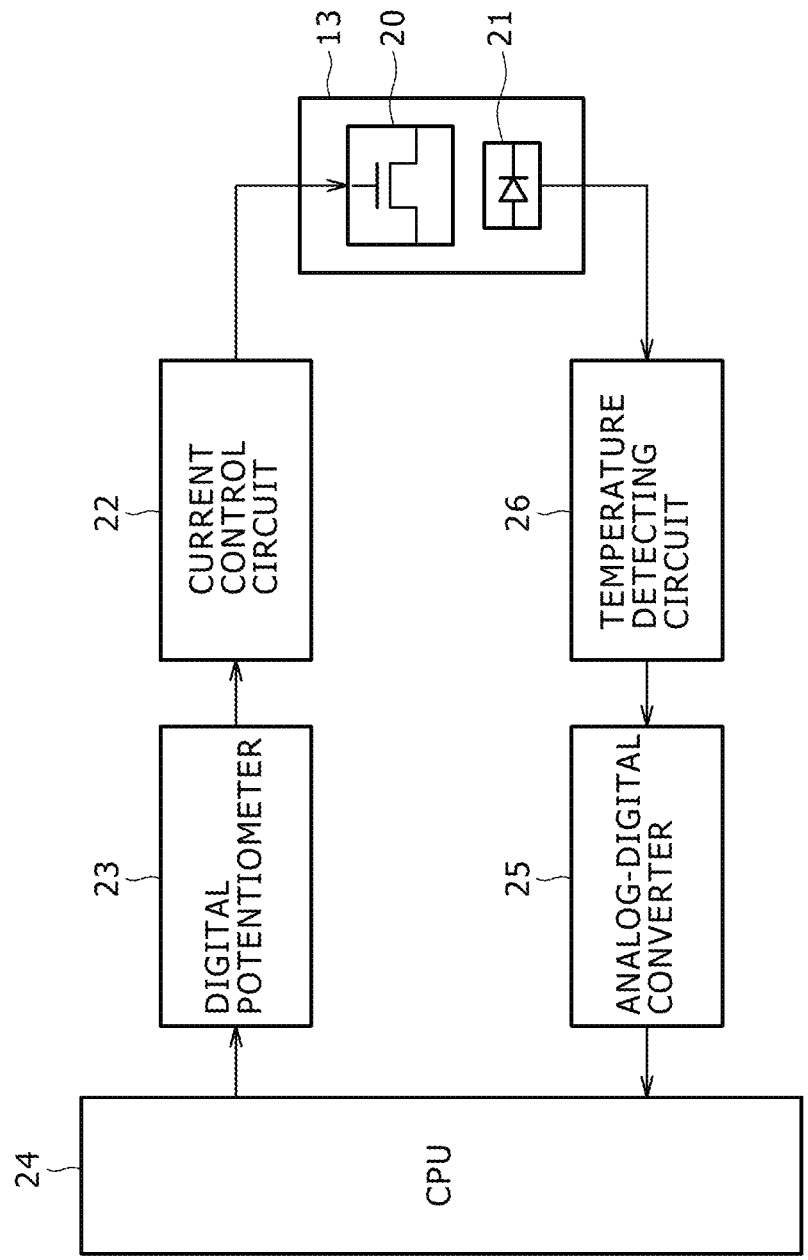
FIG. 5 is a schematic diagram showing the structure of the system to perform temperature control feedback for the control unit in the reactor according to the embodiment of the present invention.

FIG. 5 is a schematic diagram showing the structure of the system to perform temperature control feedback for the control unit in the reactor according to the embodiment.

This system is intended to feed back the amount of heat generated by the semiconductor heat generating element 20 of the heating part 13 and also to feed back the temperature detected by the temperature detecting element 21. To this end, it is composed of a current control circuit 22, a digital potentiometer 23, a control unit (CPU) 24, an analog-digital converter (ADC) 25, and a temperature detecting circuit 26.

The semiconductor heat generating element 20 may be a thin-film transistor (TFT) as mentioned later in more detail Also, the semiconductor temperature detecting element 21 may be a diode or PIN diode as mentioned later in more detail.

The feedback control system works in the following manner.

The CPU 24 controls the heating part 13 so as to attain the previously established temperature. The established temperature is a temperature which is set up by an external computer or a temperature based on the information stored in an external memory or an internal memory of the CPU 24.

At this time, the CPU 24 sends the digital potentiometer 23 the digital control signals to optimize the current value for the previously established temperature.

Thus, the digital potentiometer 23 and the current control circuit 22 keep the heating part 13 at a predetermined temperature.

On the other hand, the temperature detecting element 21, which is built in the same circuit as the heating part 13, varies in voltage depending on the temperature of the reaction region 14.

This voltage change is detected by the temperature detecting circuit 26, and the detected temperature is converted into digital signals by the analog-digital converter 25 and the converted digital signals are fed into the CPU 24.

The CPU 24 computes the difference between the established temperature and the temperature information fed from the temperature detecting element 21. Then, the CPU 24 supplies the digital potentiometer 23 with digital signals that determine the current to attain the established temperature.

Feedback with signals detected by the temperature detecting element 20 permits accurate temperature control.

Figure 6:
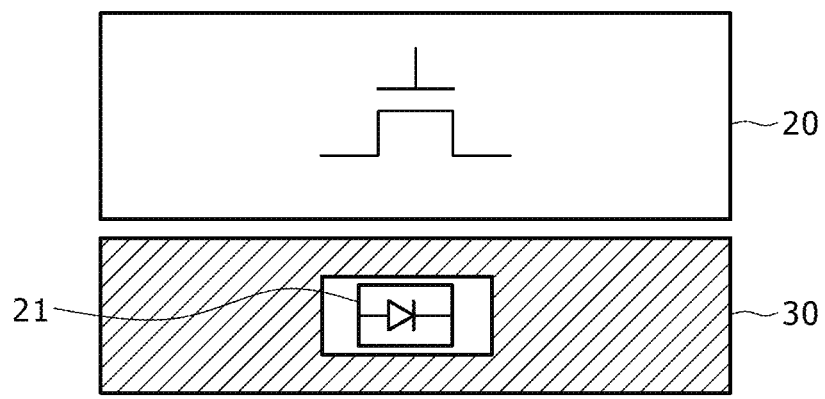
FIG. 6 is a schematic diagram showing the structure of the heating part in the reactor according to the embodiment of the present invention.

FIG. 6 is a schematic diagram showing the structure of the heating part in the reactor according to the embodiment of the present invention.

The heating part 13 is composed of the semiconductor heat generating element 20 and the temperature detecting element 21, and the latter is surrounded by the metal thin film 30.

The semiconductor heat generating element 20 generates heat, which diffuses to raise the temperature of the metal thin film 30 having a high thermal conductivity.

The metal thin film surrounding the temperature detecting element 21 transmits the temperature of the semiconductor heat generating element 20 instantly to the temperature detecting element 21.

Figure 7:
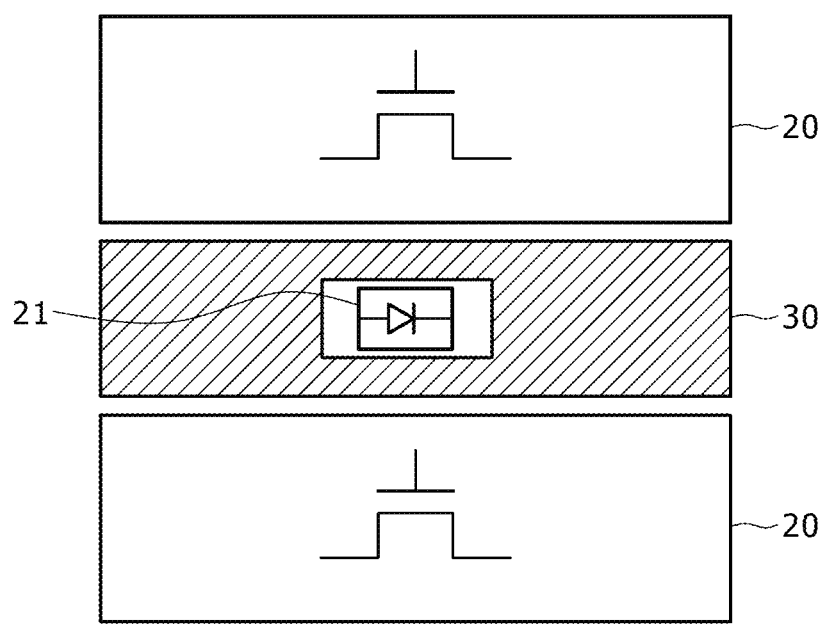
FIG. 7 is a schematic diagram showing another example of the structure of the heating part in the reactor according to the embodiment of the present invention.

FIG. 7 is a schematic diagram showing another example of the structure of the heating part in the reactor according to the embodiment of the present invention.

The structure shown in FIG. 7 is similar to that shown in FIG. 6. The temperature detecting element 21 is surrounded by the metal thin film 30, which is held between two semiconductor heat generating elements 20.

This embodiment of the present invention is characterized in that the temperature detecting element 21 is surrounded by the metal thin film 30. This structure permits the semiconductor heat generating element 20 to readily diffuse heat, which in turn heats the metal thin film 30. Thus the temperature detecting element 21 can accurately detect the temperature of the semiconductor heat generating element 20. This eventually leads to accurate temperature control.

Incidentally, the metal thin film may be replaced with a wiring layer of Al, Cu, Mo, or the like.

The reactor 10 for PCR should be provided with a matrix device for heat control as explained below.

The reactor for PCR includes the real-time PCR apparatus to detect the amount of gene expression.

The PCR apparatus is basically provided with the semiconductor heat generating part (heater) 20, the temperature detecting part (element) 21, and the fluorescence detector.

The PCR apparatus may be constructed such that the reaction signal is received by a separate functioning part which is formed above or under the TFT substrate serving as the heating part. In this case the heater matrix should preferably be formed on a comparatively large transparent insulating substrate (such as glass) which will not prevent detection of fluorescence for reaction signals.

To this end, it is desirable to use thin film transistors (TFT for short hereinafter) as the semiconductor elements from the standpoint of production cost and manufacturing process.

It is known that, however, TFT is more liable to variation in manufacturing process and change with time than single-crystal semiconductor elements.

To be more specific, the heater in the PCR apparatus should preferably be formed by low-temperature polysilicon process that forms TFT (suitable for current drive) on a large glass substrate. This process usually consists of coating a glass substrate with an amorphous silicon film and crystallizing by laser annealing for protecting the substrate from thermal deformation).

The disadvantage of this process is that a large glass substrate involves difficulties in uniform irradiation with laser energy and hence inevitably varies in the state of crystallization of polysilicon from one place to another. As the result, TFTs formed on the same substrate may vary in threshold value (Vth) by more than hundreds of mV or even more than 1 V. With such TFTs, it is difficult to construct a highly accurate and reliable PCR reactor by the existing technology.

In order to overcome this difficulty, the following embodiment is proposed in which the PCR apparatus with TFTs formed on a transparent insulating substrate achieves highly accurate temperature control with the help of a heat control matrix device.

To be concrete, the embodiment mentioned below is designed to achieve highly accurate temperature control by constituting heater units from TFTs with current copy circuit or current mirror circuit. Moreover, it is also designed to achieve a highly accurate comprehensive analysis by performing feedback with the help of a PIN diode as a sensor and by detecting fluorescence as amplification reaction signals with the help of parallel PIN diode.

The heat control matrix device pertaining to this embodiment may also be used as the heating part 13, temperature detecting part, or fluorescence detecting part of PCR 1 mentioned above.

The embodiment for the heat control matrix device covers the following ones which will be described below one by one.

Heater matrix device that can be used as the heating part (or heat generating part) capable of controlling the amount of heat generation.

Temperature detecting matrix device that can be used as the temperature detecting part.

Fluorescence detecting matrix device that can be used as the fluorescence detecting part.

Temperature fluorescence detecting matrix device that functions as both the temperature detecting matrix device and the fluorescence detecting matrix device.

Heater temperature detecting matrix device that functions as both the heater matrix device and the temperature detecting matrix device.

Heater temperature fluorescence detecting matrix device that functions as both the heater matrix device and the temperature fluorescence detecting matrix device.

The heater matrix device will be explained first.

<Heater Matrix Device>

Figure 8:
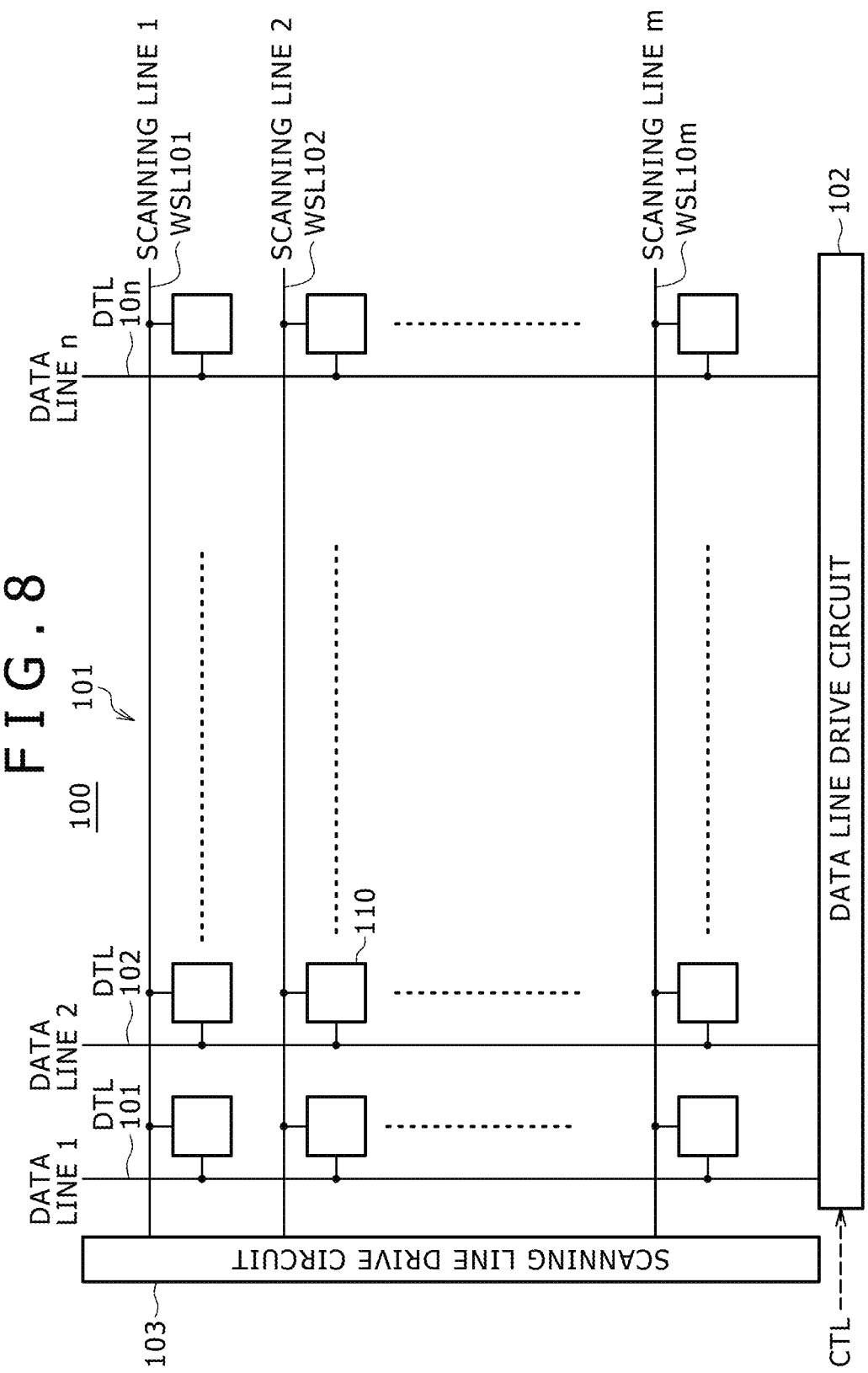
FIG. 8 is a schematic diagram showing the structure of the heater matrix device according to the embodiment of the present invention.

FIG. 8 is a schematic diagram showing the structure of the heater matrix device according to the embodiment of the present invention.

The heater matrix device 100 shown in FIG. 8 consists of the cell array 101 with heater units 110 arranged in an m×n matrix pattern, the data line driving circuit (DTDRV) 102, the scanning line driving circuit (WSDRV) 103, the data lines DTL101 . . . DTL10n which give the heater units 110 the information about the amount of heat generation, and the scanning lines WSL101 . . . WSL10m which select the heater units 110, write the information about the amount of heat generation, and supply current in response to the written information about the amount of heat generation.

The data line driving circuit 102 applies signal current to each of the data lines DTL101 . . . DTL10n in synchronism with the driving timing of the scanning lines WSL101 . . . WSL10m of the scanning line driving circuit 103, thereby writing the information about the amount of heat generation to the heater unit 110 as the heating part for each row.

The scanning line driving circuit 103 sequentially selects the scanning lines WSL101 . . . WSL10m for pulse driving. The scanning line driving circuit 103 drives the scanning lines WSL101 . . . WSL10m to control the timing at which the heater unit 110 acquires the information about the amount of heat generation.

The scanning line driving circuit 103 writes the information about the amount of heat generation to the heater unit 110 and then unselects the scanning lines WSL101 . . . WSL10m, thereby continuing to supply each heat generating part (heater unit) with the driving current of the same magnitude as the signal current.

In this way it supplies each heater unit 110 with as much current as necessary to generate heat in a desired amount.

Incidentally, the data line driving circuit 102 transfers signal current, which is the information about the amount of heat generation in response to the control signal CTL supplied from the temperature detecting and controlling system (not shown), to each data line DTL101 . . . DTL10n, thereby controlling the amount of heat generated by each heater unit 110.

In other words, the amount of heat generated by the heater unit 110 is controlled by the information about the amount of heat generation which has been written.

The heater unit 110 is constructed as explained in the following.

Figure 9:
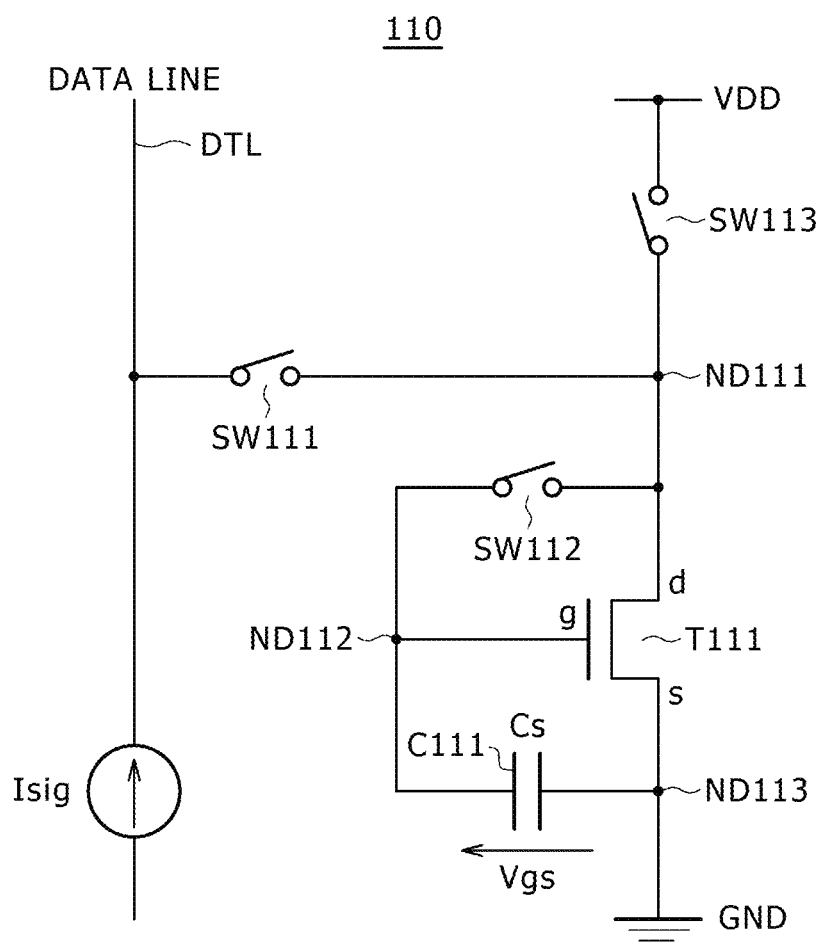
FIG. 9 is a circuit diagram showing a first example of the structure of the heater unit in the heater matrix device according to the embodiment of the present invention.
Figure 10:
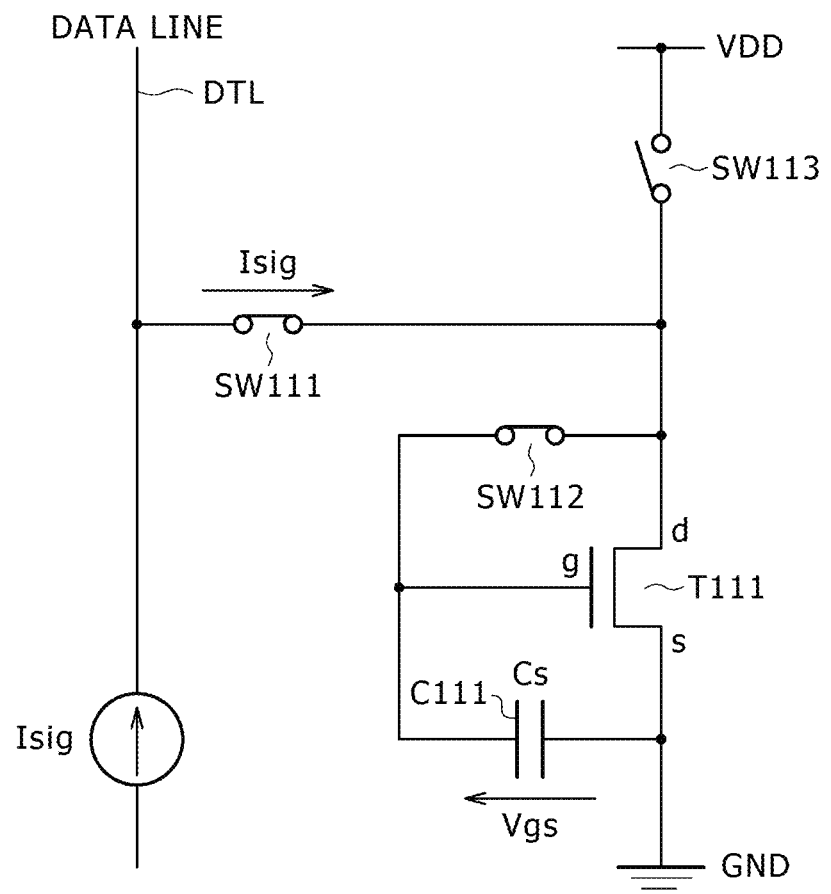
FIG. 10 is a circuit diagram showing one activated state of the circuit shown in FIG. 9.
Figure 11:
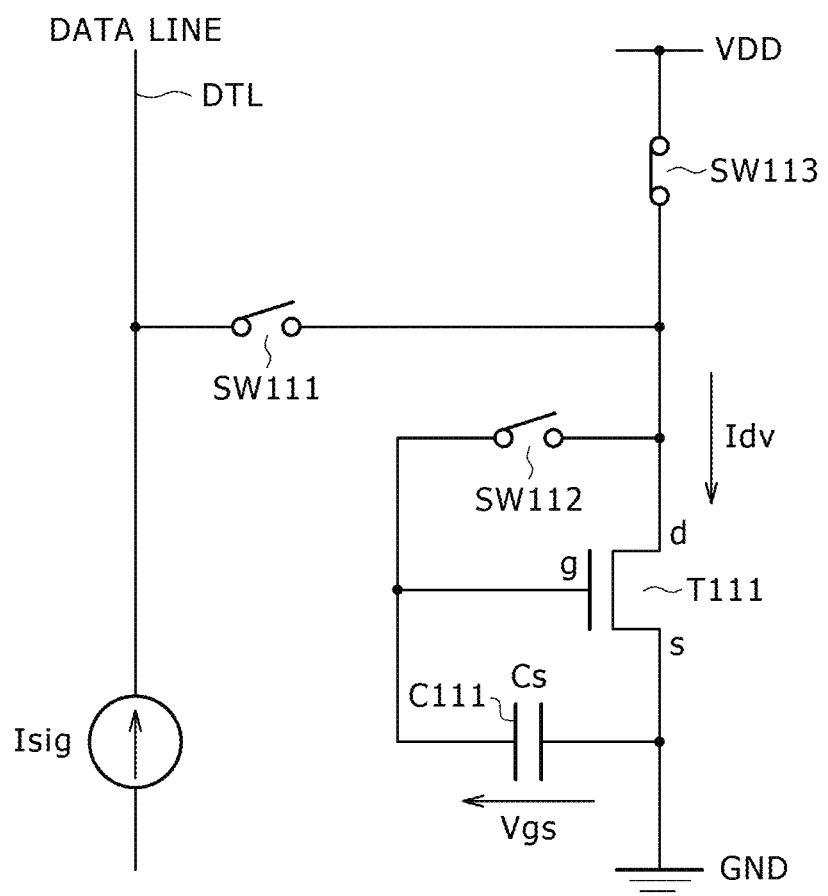
FIG. 11 is a circuit diagram showing another activated state of the circuit shown in FIG. 9.

FIG. 9 is a circuit diagram showing a first example of the structure of the heater unit in the heater matrix device according to the embodiment of the present invention. FIG. 10 is a circuit diagram showing one activated state of the circuit shown in FIG. 9. FIG. 11 is a circuit diagram showing another activated state of the circuit shown in FIG. 9.

The heater unit 110 shown in FIG. 9 consists of the transistor T111 which is an n-channel insulated gate transistor, the switches SW111, SW112, and SW113, the capacitor C111, and the nodes ND111, ND112, and ND113. Incidentally, symbols g, d, and s in FIG. 9 represent gate, drain, and source, respectively, and symbol Cs denotes the capacity of the capacitor C111.

The heater unit 110 is constructed such that the transistor 111 which functions as a driving transistor has its drain d, gate g, and source s connected respectively to the nodes ND111, ND112, and ND113. The node ND113 is connected to the ground potential GND.

The switch SW111 is connected to the data line DTL which transmits signal current $I_{sig}$ and the node ND113. The switch SW112 is connected to the node ND111 and the node ND112. The switch SW113 is connected to the node ND111 and the source potential VDD.

The capacitor C111 is connected to the node ND112 through its first electrode and the node ND113 (or ground potential GND) through its second electrode.

In the heater unit 110, the switches SW111 and SW112 turn on and off in phase in response to the level of the scanning lines WSL101 . . . WSL10m.

The switch SW113 turn on and off complimentarily to the switches SW111 and SW112 in response to the level of the scanning lines WSL101 . . . WSL10m.

Of these constituents, the switches SW111 and SW112 receive the information about the amount of heat generation which is given to the data line DTL when the scanning line WSL is selected.

The capacitor C111 holds the information about the amount of heat generation even after the scanning line has been unselected.

And, the transistor T111 and the switch SW113 allow current to flow according to the written information about the amount of heat generation, and they function as the driver to generate heat in response to the current.

In the heater unit 110, the driving current flows from the source potential VDD to the ground potential GND through the transistor T111 and the switch SW113.

The resistance of the transistor T111 and the switch SW113 generates Joule heat to be used as the heat source.

Incidentally, the transistor T111 is not limited to n-channel one; it may be replaced by p-channel one.

In this embodiment, the information about the amount of heat generation which is transmitted from the data line DTL is signal current $I_{sig}$. Therefore, it is desirable to construct a circuit which controls heat by converting this signal current into signal voltage. The action of the circuit shown in FIG. 9 will be described with reference to FIGS. 10 and 11.

FIG. 10 shows the action of writing to the heater unit 110 the information about the amount of heat generation in the form of current level (or signal current). During this writing action, the switches SW111 and SW112 are on and the switch SW113 is off.

The transistor T111 permits the signal current $I_{sig}$ to flow, with the drain d and the gate g shorted by the switch SW2. See FIG. 10.

As the result, the signal voltage $V_{gs}$ occurs between the gate and the source in response to the value of the signal current $I_{sig}$.

In the case where the transistor T111 is that of enhancement mode (or the threshold value $V_{th}>0$), it works in the saturation region. Thus the signal current $I_{sig}$ and the signal voltage $V_{gs}$ are related to each other by the following well-known equation.

[Equation 1]

$$I_{sig} = \mu \cdot C_{ox} \cdot W/L/2 \cdot (V_{gs} - V_{th})^2 \quad (1)$$

In the equation above, μ denotes the carrier mobility, $C_{ox}$ denotes the gate capacity per unit area, W denotes the channel width, and L denotes the channel length.

When the circuit becomes stable, the switch SW112 turns off so that the gate-source voltage $V_{sg}$ is stored in the capacitor C111. Then the switch SW111 turns off to complete the signal writing action.

Then, the switch SW113 turns on at any timing as shown in FIG. 11, so that current flows from the source voltage VDD to the ground potential GND. At this time, the driving current $I_{drv}$ flowing through the transistor T111 is represented by the equation (2) below irrespective of the source-drain voltage $V_{ds}$ if source voltage VDD is set sufficiently high and the resistance of the switch SW113 is set sufficiently low so that the transistor T111 works in the saturation region. And the driving current $I_{drv}$ coincides with the signal current $I_{sig}$ mentioned above.

[Equation 2]

$$I_{drv} = \mu \cdot C_{ox} \cdot W/L/2 \cdot (V_{gs} - V_{th})^2 \quad (2)$$

In general, the parameters that appear in the right side of the equations (1) and (2) above vary from one substrate to another or vary from one position to another in the same substrate.

However, driving as shown in FIGS. 10 and 11 makes the signal current $I_{sig}$ to coincide with the driving current $I_{drv}$ irrespective of the values of the individual parameters.

Since the signal current $I_{sig}$ mentioned above can be generated accurately by the control circuit outside the heater matrix device, Joule heat generated by the heater unit (shown in FIG. 9) has an accurate value determined by VDD×$I_{sig}$ (or the product of the source voltage VDD and the signal current $I_{sig}$) without being affected by variation in transistor characteristics.

Figure 12:
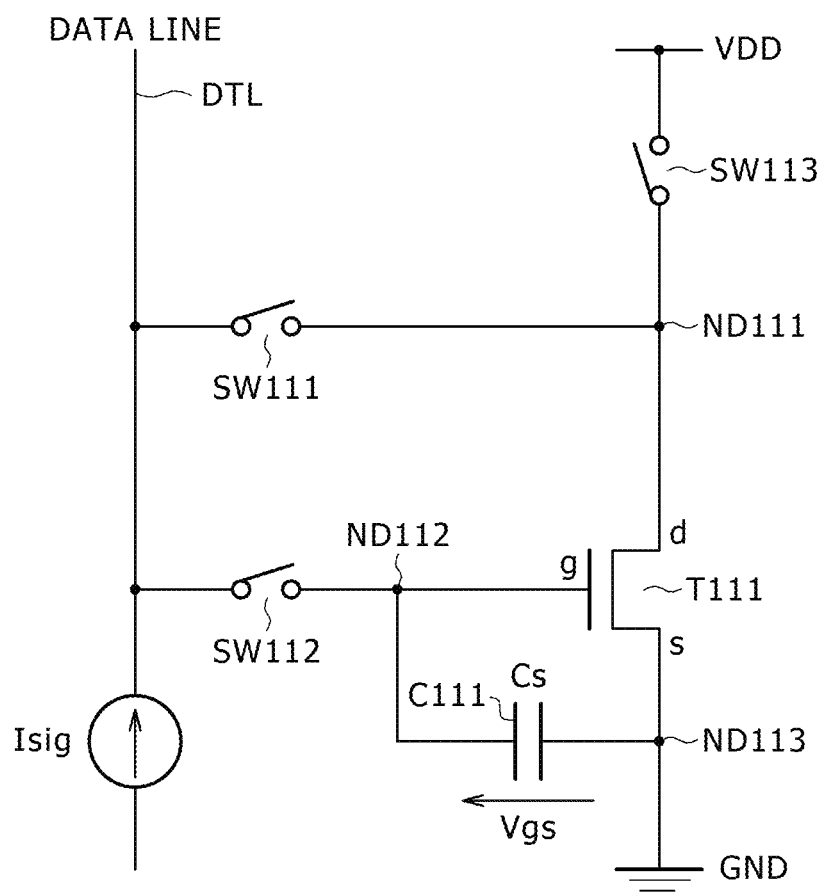
FIG. 12 is a circuit diagram showing a modified example of the circuit shown in FIG. 9.

FIG. 12 is a circuit diagram showing a modified example of the circuit shown in FIG. 9.

The circuit shown in FIG. 12 differs from that shown in FIG. 9 in the connection of the switch SW112. To be specific, the switch SW112 is placed between the data line DTL and the node ND112 instead of being placed between the node ND111 and the node ND112.

The circuit shown in FIG. 12 is equivalent in its action to the circuit shown in FIG. 9; the difference is that the node ND112 is connected to the data line DTL through the switch SW111 and the node ND111 in FIG. 9.

The circuit shown in FIG. 12 works in the same way as that shown in FIG. 9. That is, the switches 111 and 112 turn on and the switch SW113 turns off at the time of signal writing. And, the switches SW111 and SW112 turn off and the switch SW113 turns on at the time of heat generation.

The circuit shown in FIG. 12 functions in the same way as the circuit shown in FIG. 9.

Figure 13:
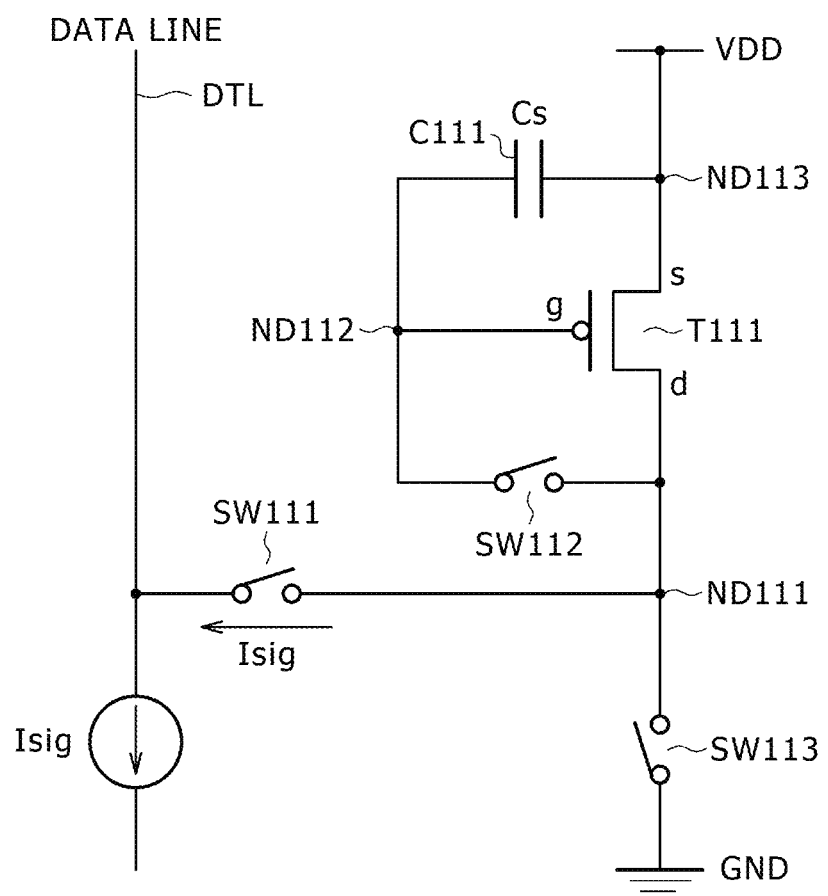
FIG. 13 is a circuit diagram showing another modified example of the circuit shown in FIG. 9.

FIG. 13 is a circuit diagram showing another modified example of the circuit shown in FIG. 9.

The circuit shown in FIG. 13 differs from that shown in FIG. 9 in that the transistor T111 is a p-channel transistor and the direction of current is reversed.

In the case of the circuit shown in FIG. 13, the source s of the transistor T111 is connected to the source potential (node ND113), the drain d of the transistor T111 is connected to the node ND111, and the switch SW113 is connected to the intermediate point between the node ND111 and the ground potential GND.

The circuit shown in FIG. 13 is in principle common to that shown in FIG. 9 and both function in the same way.

According to the embodiment of the present invention, it is desirable to employ a p-channel insulation gate transistor (PMOS) for the low-temperature polysilicon thin film transistor (TFT) because of its stable characteristics.

Figure 14:
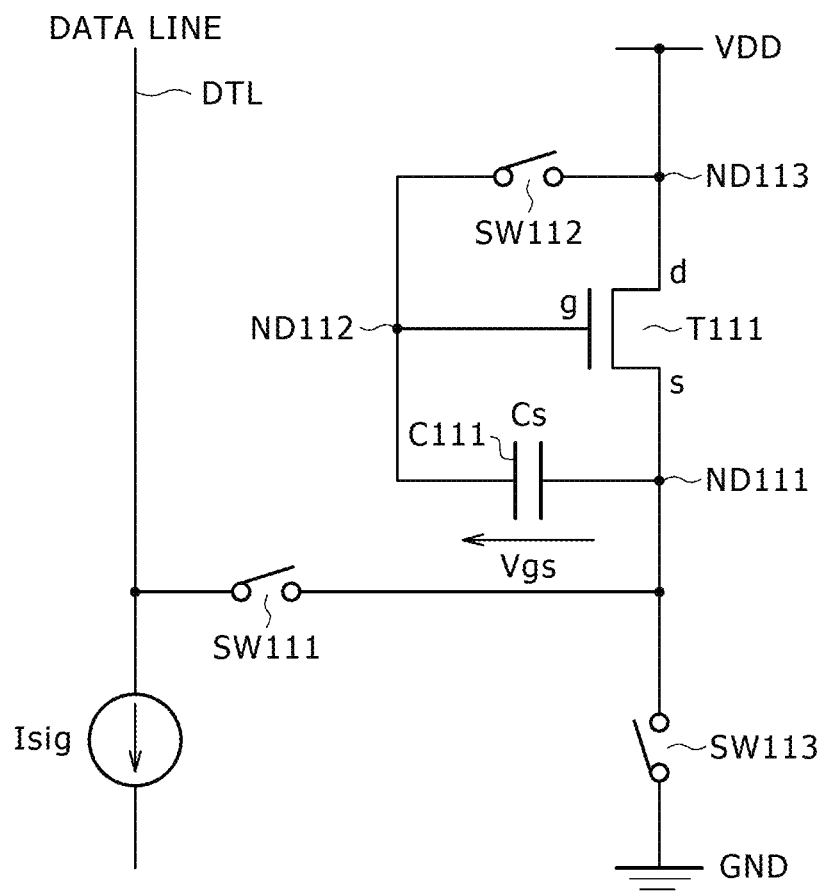
FIG. 14 is a circuit diagram showing further another modified example of the circuit shown in FIG. 9.

FIG. 14 is a circuit diagram showing further another modified example of the circuit shown in FIG. 9.

The circuit shown in FIG. 14 is identical with that shown in FIG. 9 in the way the switches SW111, SW112, and SW113 are controlled but it is so designed as to draw the signal current $I_{sig}$ from the source of the transistor T111.

In the case of the circuit shown in FIG. 14, the transistor T111 is an n-channel transistor and the drain d of the transistor T111 is connected to the source potential (VDD), the source s of the transistor T111 is connected to the node ND111, and the switch SW113 is connected to the intermediate point between the node ND111 and the ground potential GND.

The circuit shown in FIG. 14 works in the same way as that shown in FIG. 9 in that it permits the signal current $I_{sig}$ to flow while the gate and the drain are shorted to each other and the resulting gate-source voltage $V_{gs}$ is stored in the capacitor C111. Both function in the same way.

Figure 15:
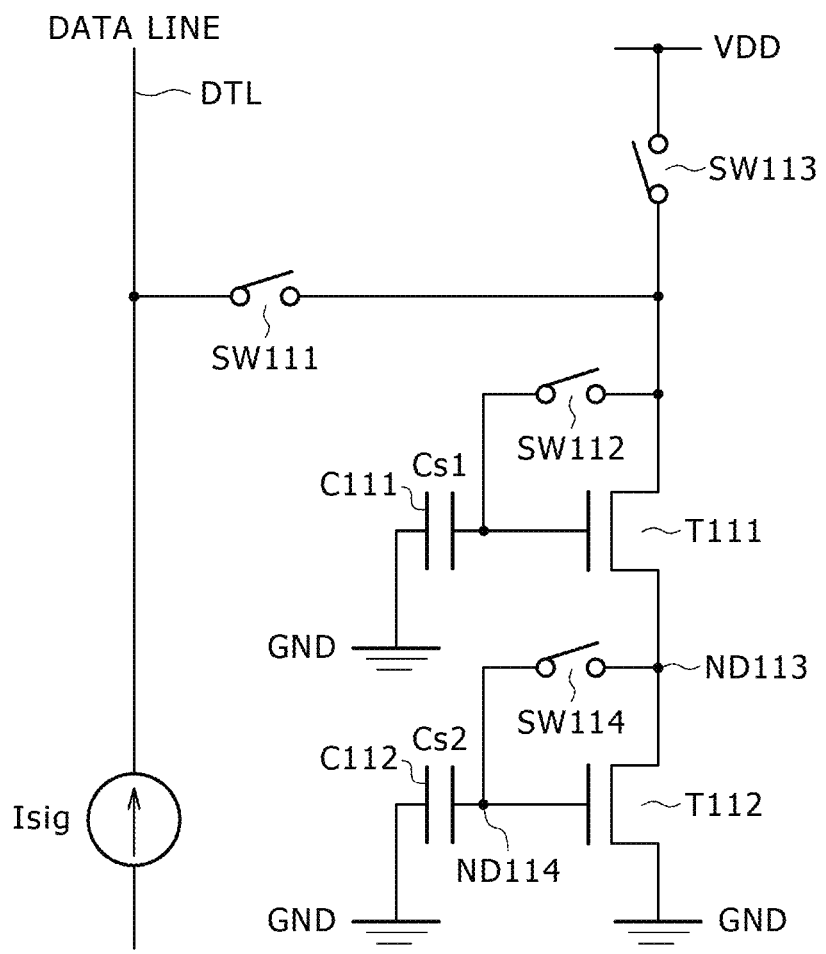
FIG. 15 is a circuit diagram showing further another modified example of the circuit shown in FIG. 9.

FIG. 15 is a circuit diagram showing further another modified example of the circuit shown in FIG. 9.

The circuit shown in FIG. 15 differs from that shown in FIG. 9 in that it additionally has the transistor T112, the switch SW114, and the capacitor 112. The switch SW114 is controlled in the same way as the switch SW112.

The transistor T112 has its gate connected to the node ND114, its drain connected to the node ND113, and its source connected to the ground potential GND. The switch SW114 is connected to the intermediate point between the node ND113 and the node ND114. The capacitor C112 has its first electrode connected to the node ND114 and its second electrode connected to the ground potential GND.

This circuit works in the following way.

In the circuit shown in FIG. 9, the signal current $I_{sig}$ is given by the equation (1), the drive current $I_{drv}$ is given by the equation (2), and the signal current $I_{sig}$ coincides with the drive current $I_{drv}$, as mentioned above. This fact accords with the principle that the current flowing through a MOS (metal oxide semiconductor) transistor depends only on the gate-source voltage $V_{gs}$ irrespective of the drain-source voltage $V_{ds}$ for action in the saturation region.

However, in a practical transistor, an increase in the drain-source voltage $V_{ds}$ usually results in a slight increase in the drain-source current $I_{ds}$. Probably, this is due to the back gate effect (the potential of the drain affects the conduction state of the channel) and the short channel effect (the depletion layer at the end of the drain extends to the source side to shorten the effective channel length L).

This will be illustrated with reference to the circuit shown in FIG. 9. In the case where a comparatively small signal current $I_{sig}$ is written, the gate-source voltage $V_{gs}$ that arises according to the equation (1) is a comparatively small value and the drain-source voltage $V_{ds}$ is a small value equal to the gate-source voltage $V_{gs}$.

On the other hand, at the time of driving, the drive current $I_{drv}$ is small and hence the voltage drive across the switch SW113 is small, and the drain-source voltage $V_{ds}$ of the transistor T111 becomes a larger value than that at the time of writing. Thus, usually the drain-source voltage $V_{ds}$ at the time of writing is not equal to that at the time of driving. Consequently, the signal current $I_{sig}$ and the drive current $I_{drv}$ do not exactly coincide with each other. This may be a reason why the desired amount of heat generation is not obtained.

By contrast, the circuit shown in FIG. 15 functions in the following manner.

As in the circuit shown in FIG. 9, the drain-source voltage $V_{ds}$ of the transistor T111 at the time of writing usually varies from that at the time of driving.

However, when the drain-source voltage $V_{ds}$ is large at the time of driving, the drive current $I_{drv}$ becomes larger than the signal current $I_{sig}$, however, if the transistor T112 is working in its saturation state (or working close to the constant current source), its differential resistance takes on a very large value.

Thus, with a slight increase in the drive current $I_{drv}$, the source potential of the transistor T111 greatly increases. This reduces the gate-source voltage $V_{gs}$ of the transistor T111 and also decreases the drive current $I_{drv}$. As the result, the drive current $I_{drv}$ does not increase so much relative to the signal current $I_{sig}$, and coincidence between the drive current $I_{drv}$ and signal current $I_{sig}$ becomes better than that in the case shown in FIG. 9.

Figure 16:
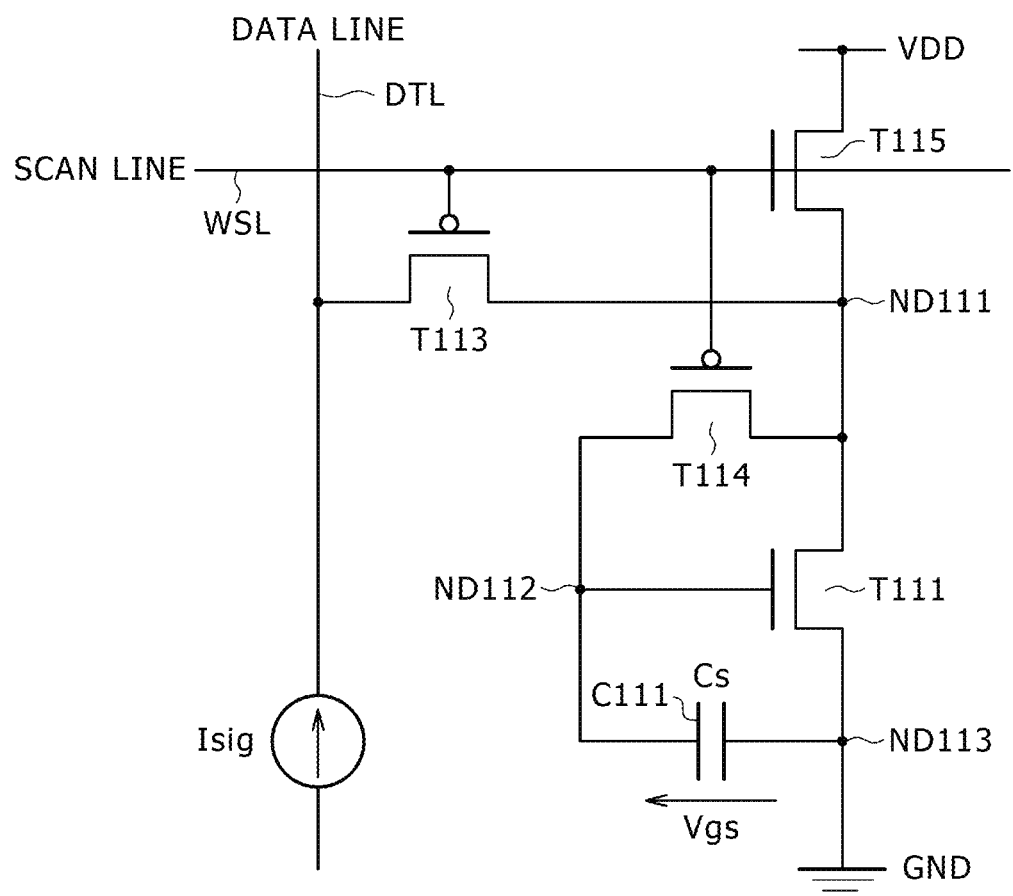
FIG. 16 is a circuit diagram showing a typical example of the circuit shown in FIG. 9.

FIG. 16 is a circuit diagram showing a typical example of the circuit shown in FIG. 9.

The circuit shown in FIG. 16 is composed of the p-channel transistor T113 (which functions as the switch SW111), the p-channel transistor T114 (which functions as the switch SW112), and the n-channel transistor T115 (which functions as the switch SW113).

These three transistors T113, T114, and T115 have their gates commonly connected to the scanning line WSL. When the scanning line WSL is at a low level, signal writing is accomplished, and when it is at a high level, drive action is performed.

As mentioned later, the present invention may be modified such that the transistors T113, T114, and T115 do not have their gates commonly connected to the scanning line WSL. However, the circuit shown in FIG. 16 is desirable because of its simple structure.

Figure 17:
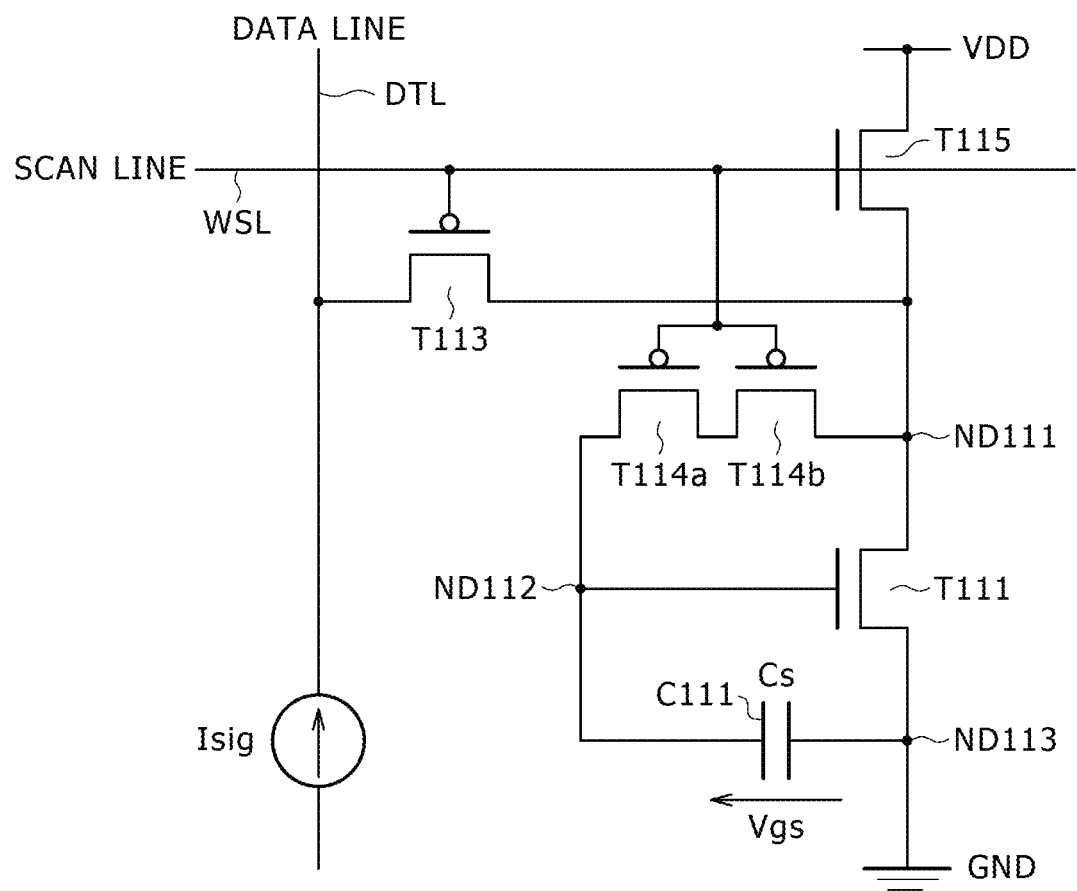
FIG. 17 is a circuit diagram showing a modified example of the circuit shown in FIG. 16.

FIG. 17 is a circuit diagram showing a modified example of the circuit shown in FIG. 16.

The circuit shown in FIG. 17 differs from that shown in FIG. 16 in that it has the transistors T114a and T114b.

TFTs are usually liable to become defective in the manufacturing process. For example, there is the possibility that the switch transistor permits a minute leakage current to flow when it is off.

The circuit shown in FIG. 16 works in such a way that when a leakage current occurs in the transistor T114, the leakage current changes the voltage held in the capacitor C111. This leads to a situation in which adequate heat generation cannot be maintained.

By contrast, the circuit shown in FIG. 17, which has the two transistors T114a and T114b connected in series in place of the one transistor T114 used in the circuit shown in FIG. 16, is able to suppress leakage current as a whole even though one of the two transistors is defective.

By the same token, the transistor T114 may be replaced by three or more transistors connected in series or each of the transistors T113 and T115 may be replaced by more than one transistor connected in series.

Figure 18:
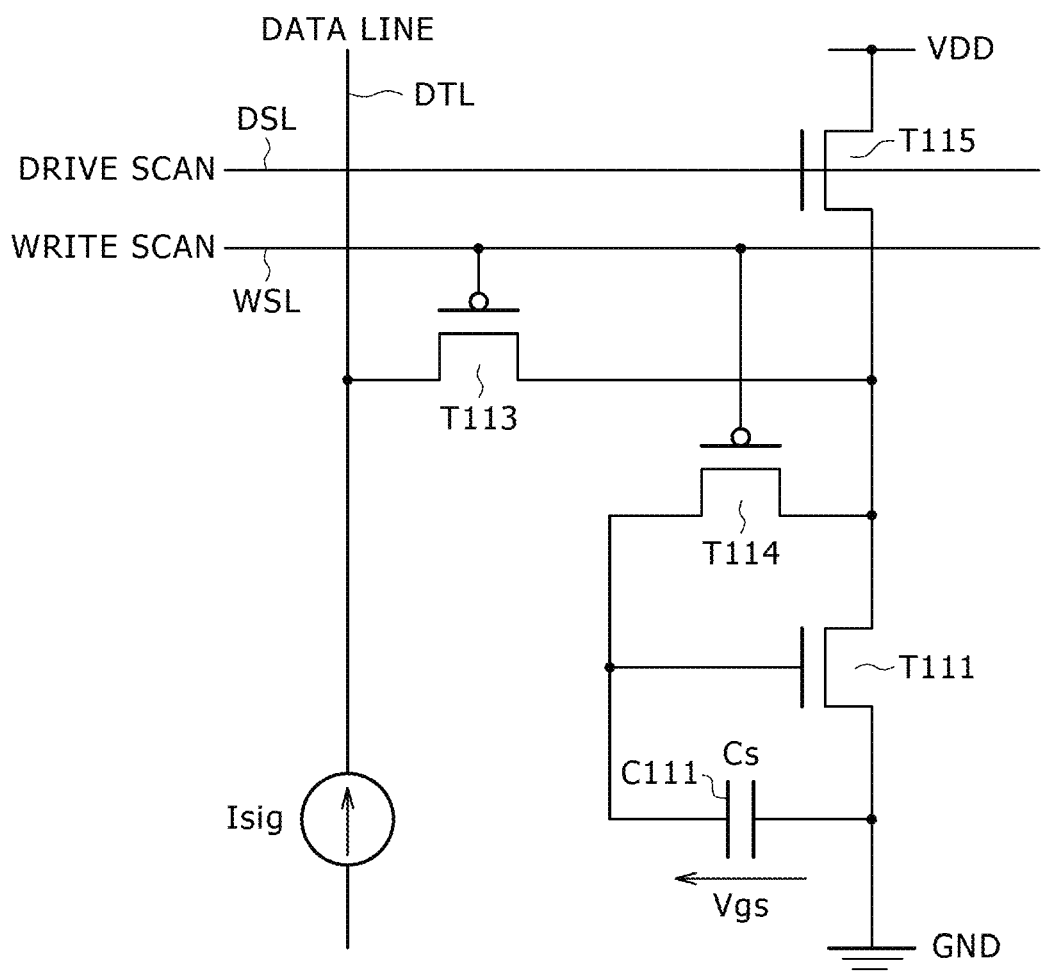
FIG. 18 is a circuit diagram showing another modified example of the circuit shown in FIG. 9.

FIG. 18 is a circuit diagram showing another modified example of the circuit shown in FIG. 9.

Figure 19:
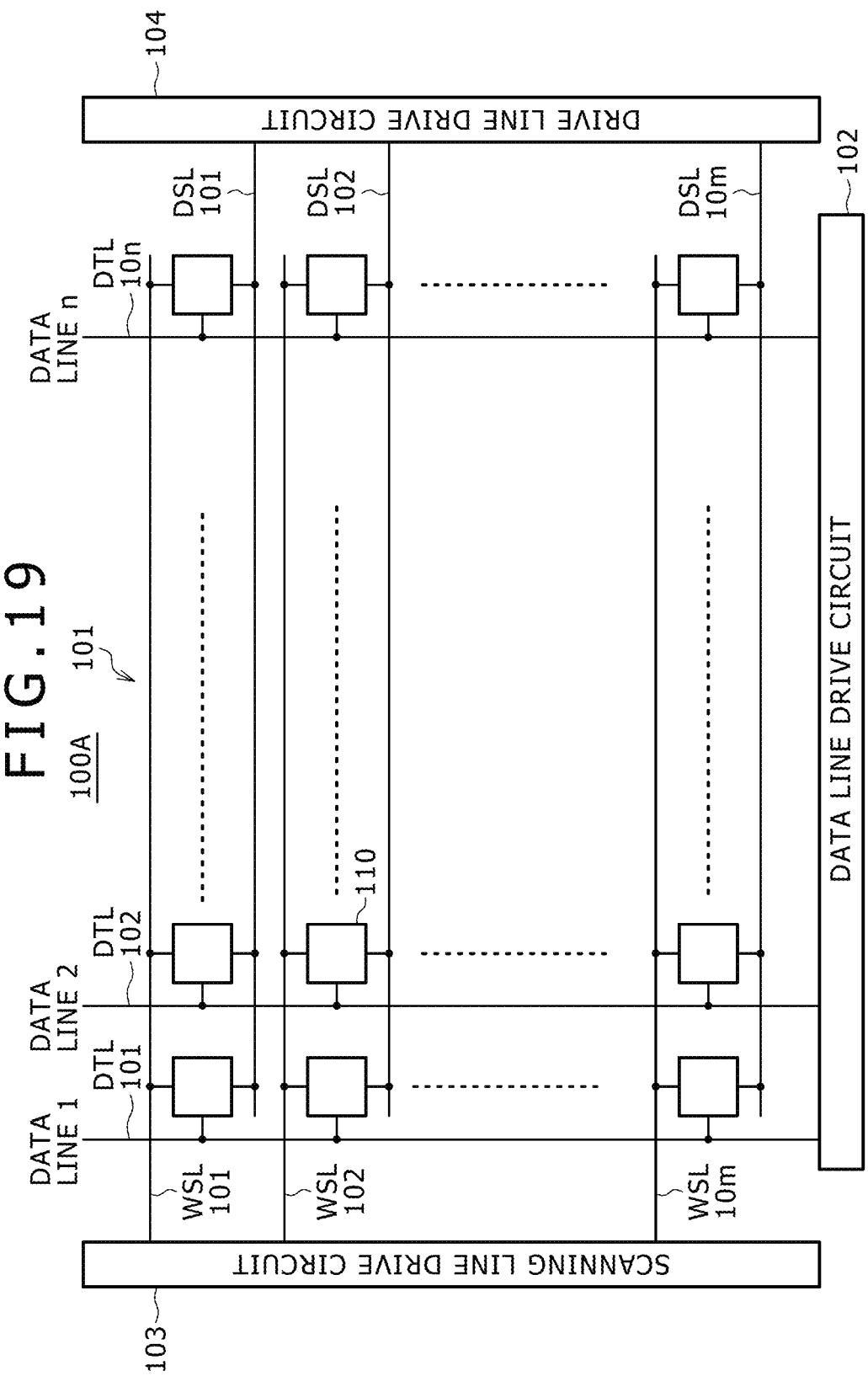
FIG. 19 is a schematic diagram showing the structure of the heater matrix device having the heater unit shown in FIG. 18.

FIG. 19 is a schematic diagram showing the structure of the heater matrix device having the heater unit shown in FIG. 18.

The circuit shown in FIG. 18 is constructed such that the transistor T115 is controlled independently of the transistors T113 and T114.

The heater matrix device 100A shown in FIG. 19 differs from that shown in FIG. 8 in that it additionally has the drive line driving circuit 104 and the drive scanning lines DSL101 ... DSL10m which drive the transistor T115.

In this case, at the time of signal writing, the write scanning lines SWL101 ... SWL10m and the drive scanning lines DSL101 ... DSL10m are kept low.

After writing has been completed (or after the write scanning lines have been made high), the drive scanning lines DSL101 ... DSL10m are made high at arbitrary timing, so that heat generation is activated.

Conversely, as the drive scanning lines DSL101 ... DSL10m are made low, heat generation can be suspended easily; this is desirable when it is necessary to lower temperature rapidly. This leads to capability of adjusting the duration of heat generation. That is, the device can produce a very small amount of heat very accurately even when the signal current source cannot generate a small current accurately.

Incidentally, in the case where it is desirable to avoid intermittent heating due to the foregoing action, the steps for heat generation and suspension of heat generation should be repeated several times in the period from the writing of the information about the amount of heat generation to the next writing of the information about the amount of heat generation. This ensures temporal stability of heat generation.

Figure 20:
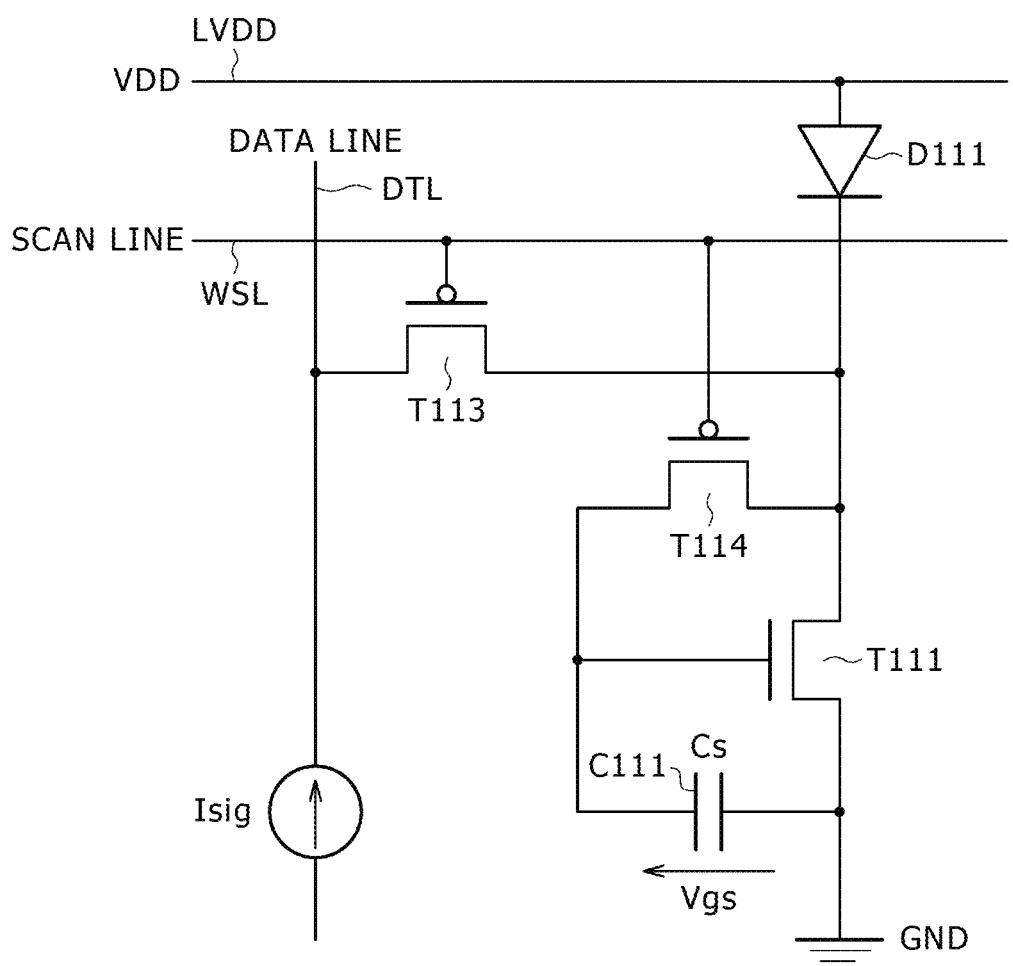
FIG. 20 is a circuit diagram showing another modified example of the circuit shown in FIG. 9.

FIG. 20 is a circuit diagram showing another modified example of the circuit shown in FIG. 9.

In FIG. 20, the supply potential line LVDD is parallel to the scanning line WSL and the diode D111 is equivalent to the switch SW113 shown in FIG. 9.

At the time of signal writing, the source voltage VDD is brought to a low level to turn off the diode D111, and at the time of driving, the source voltage VDD is brought to a high level to turn on the diode D111. In this way the diode D111 functions as a switch Thus, the circuit shown in FIG. 20 functions in the same way as the circuit shown in FIG. 18.

Figure 21:
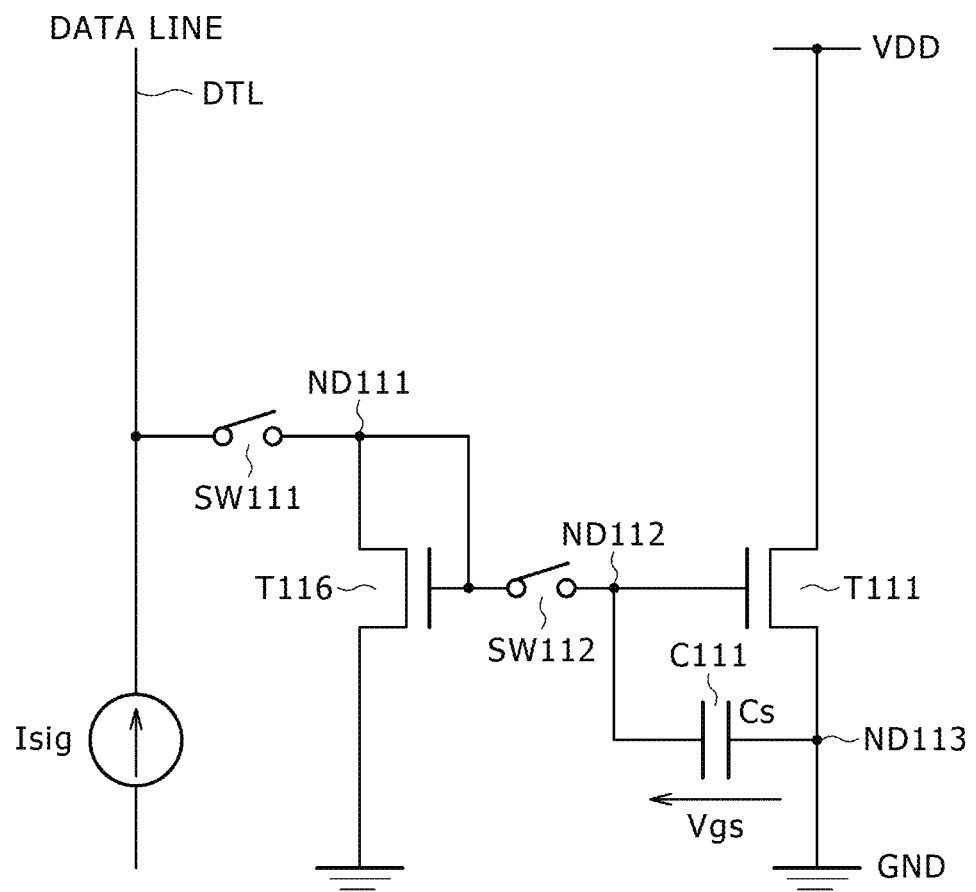
FIG. 21 is a circuit diagram showing further another modified example of the circuit shown in FIG. 9.

FIG. 21 is a circuit diagram showing further another modified example of the circuit shown in FIG. 9.

The circuit shown in FIG. 21 differs from that shown in FIG. 9 in that it has the transistor T116 to convert the signal current $I_{sig}$ into a voltage and the transistor T111 to permit current to flow for heat generation.

The transistor T116 has its drain and gate connected to each other, with the connecting point connected to the nodes ND111 and ND112, and the transistor T116 has its source connected to the ground potential GND.

At the time of signal writing, the switches SW111 and SW112 becomes on to supply the signal current $I_{sig}$ to the transistor T116. In this situation, the following equation (3) holds.

[Equation 3]

$$I_{sig} = \mu \cdot C_{ox} \cdot W1/L/2 \cdot (V_{gs} - V_{th})^2 \quad (3)$$

The parameters in Equation (3) are defined as in Equation (1). The transistor T116 has a channel width of $W_1$. At the time of driving, the switches SW111 and SW112 turn off.

On the other hand, the capacitor C111 holds the gate-source voltage $V_{gs}$ due to writing, so that the drive current $I_{drv}$ flowing through the transistor T111 accords with the following equation (4).

[Equation 4]

$$I_{drv} = \mu \cdot C_{ox} \cdot W2/L/2 \cdot (V_{gs} - V_{th})^2 \quad (4)$$

Since the transistor T111 has channel width of $W_2$ and the transistors T116 and T111 are formed in a minute heating part, $C_{ox}$ and $V_{th}$, which are the parameters of the Transistors T116 and T111, are considered to be equal to each other. Moreover, the channel length L can be designed to be identical for these transistors. As the result, the equations (3) and (4) yield the following equation (5).

$$I_{drv}/I_{sig} = W_2/W_1 \quad (5)$$

In general, the parameters in the right side of the equations (3) and (4) above vary from one substrate to another or vary from one position to another in the same substrate. It is known that these parameters have nothing to do with the ratio between the signal current $I_{sig}$ to the drive current $I_{drv}$ which coincides with the ratio between the channel width of the transistor T111 and the channel width of the transistor T116.

This circuit differs from that shown in FIG. 9 in that it makes it possible to arbitrarily adjust the ratio between the signal current $I_{sig}$ and the drive current $I_{drv}$. If it is desirable to generate a very small amount of heat but the external circuit cannot generate a very small amount of current, then this problem is solved by designing the channel width such that the right side of the equation (5) takes on a small value. Conversely, it is also easy to design such that a very small signal current $I_{sig}$ can control a large drive current $I_{drv}$.

The foregoing is a description of the heater matrix device.

The following is a description of the temperature detecting matrix device.

<Temperature Detecting Matrix Device>

Figure 22:
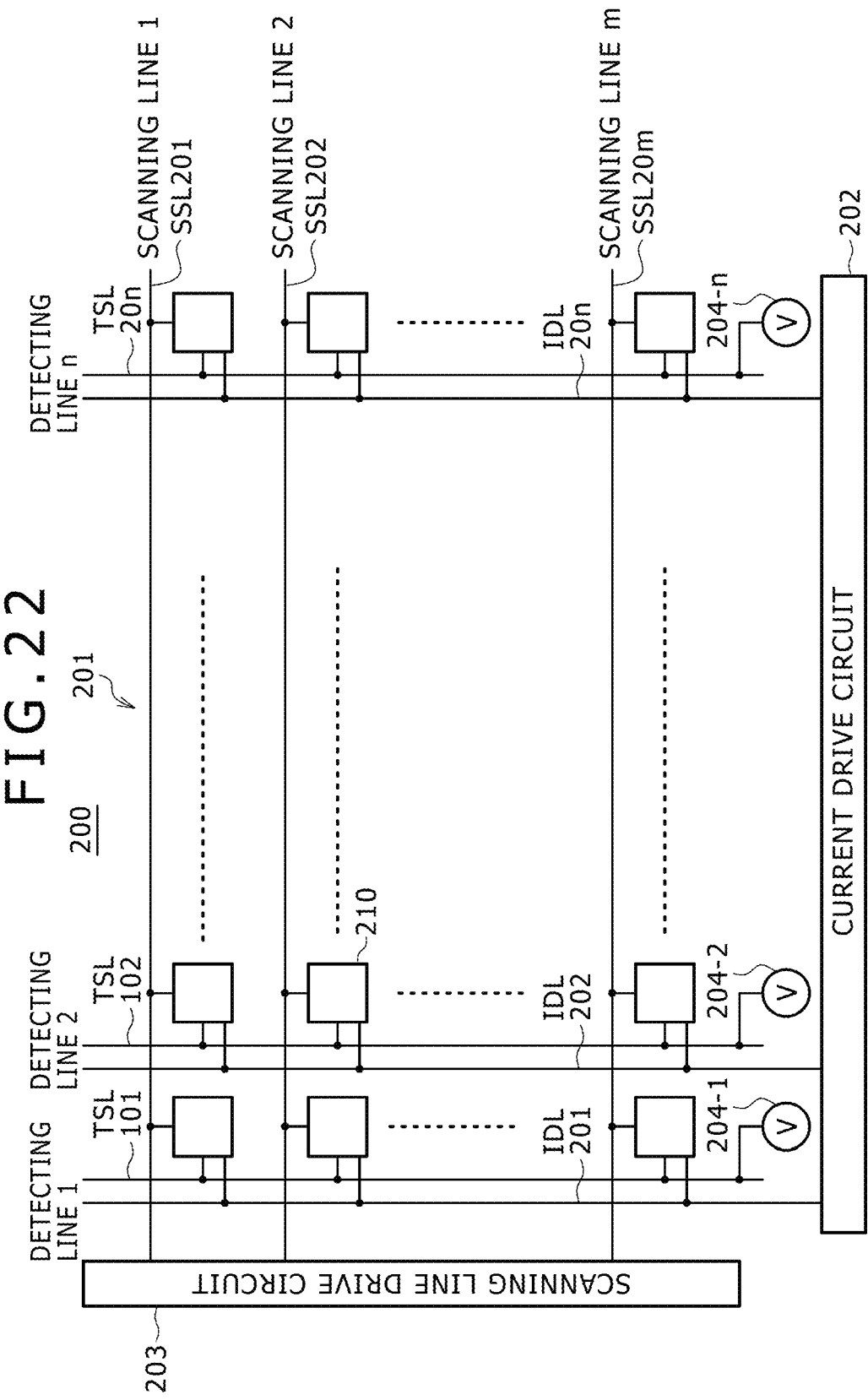
FIG. 22 is a schematic diagram showing the structure of the temperature detecting matrix device according to the embodiment of the present invention.

FIG. 22 is a schematic diagram showing the structure of the temperature detecting matrix device according to the embodiment of the present invention.

The temperature detecting matrix device 200 shown in FIG. 22 consists of the cell array 201 of temperature detecting units 210 arranged in an m×n matrix pattern, the current driving circuit (IDRV) 202, the scanning line driving circuit (WSDRV) 203, the voltage detecting lines (V) 204-1 . . . 204-n, the current driving lines IDL201 . . . IDL20m, the temperature sense lines TSL201 . . . TSL20m, and the scanning liens SSL201 . . . SSL20m, which select the temperature detecting units 210 and send the detected signals from the temperature detecting unit 210 to the temperature sense lines TSL201 . . . TSL20m.

Figure 23:
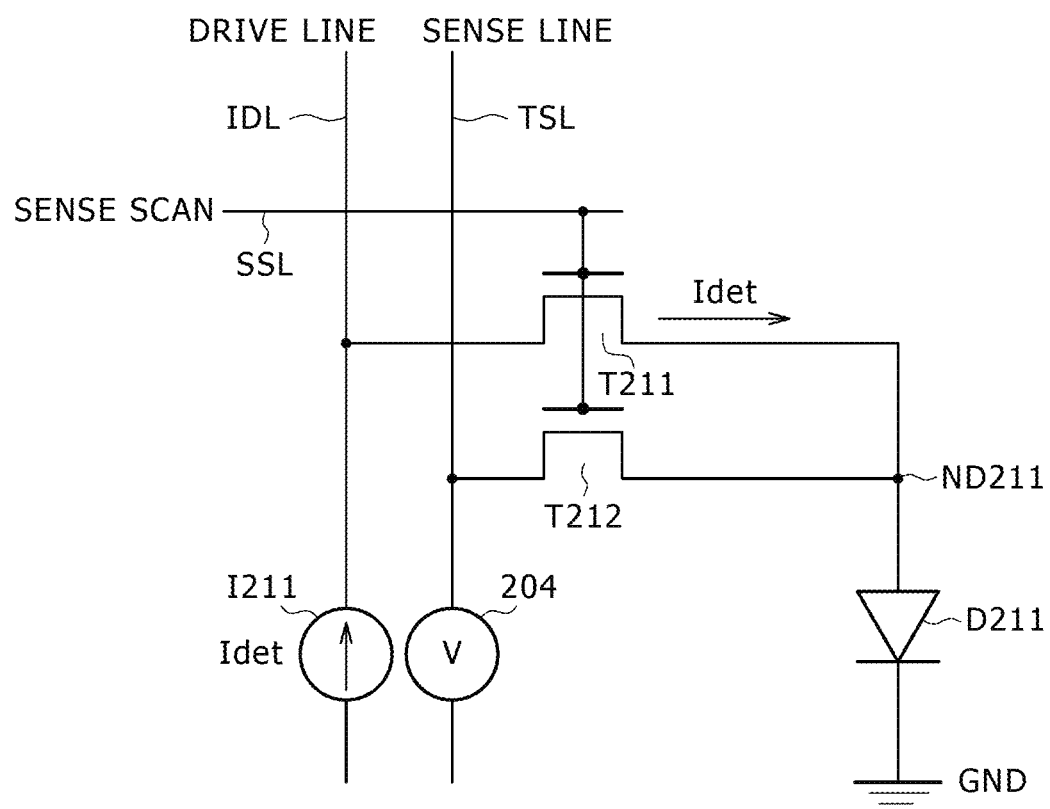
FIG. 23 is a circuit diagram showing the structure of the temperature detecting unit according to the embodiment of the present invention.

FIG. 23 is a circuit diagram showing the structure of the temperature detecting unit according to the embodiment of the present invention.

The temperature detecting unit 210 shown in FIG. 23 has the PIN diode D211, the n-channel transistors T211 and T212 which function as switches, and the node ND211.

The PIN diode 211 has its anode connected to the node ND211 and its cathode connected to the ground potential GND.

The transistor T211 has its source and drain connected to the node ND211 and the current driving line IDL, respectively. The transistor T212 has its source and drain connected to the node ND111 and the temperature detecting line TSL.

And, the transistors T211 and T212 have their gates connected in common to the scanning line SSL.

The transistors T211 and T212 turned on when the scanning line SSL is at a high level and are turned off when the scanning line SSL is at a low level.

The temperature detecting unit 210 functions in the following manner.

It is connected to the current source I211 that supplies current $I_{det}$ to the current driving line IDL, so that the forward current $I_{det}$ flows to the PIN diode D211 from the current source I211 connected to the current driving line IDL when the scanning line SSL is at a high level.

At the same time, the voltage detector 204 is connected to the temperature sense line TSL, so that the forward voltage that occurs in the PIN diode D211 is detected. The voltage detector 204 may be an analog-digital converter.

The temperature detecting unit 210 detects temperature as the PIN diode D211 senses dark current. The thus detected temperature is referenced to control the amount of heat generation by each heater unit in the heater matrix device.

Figure 24:
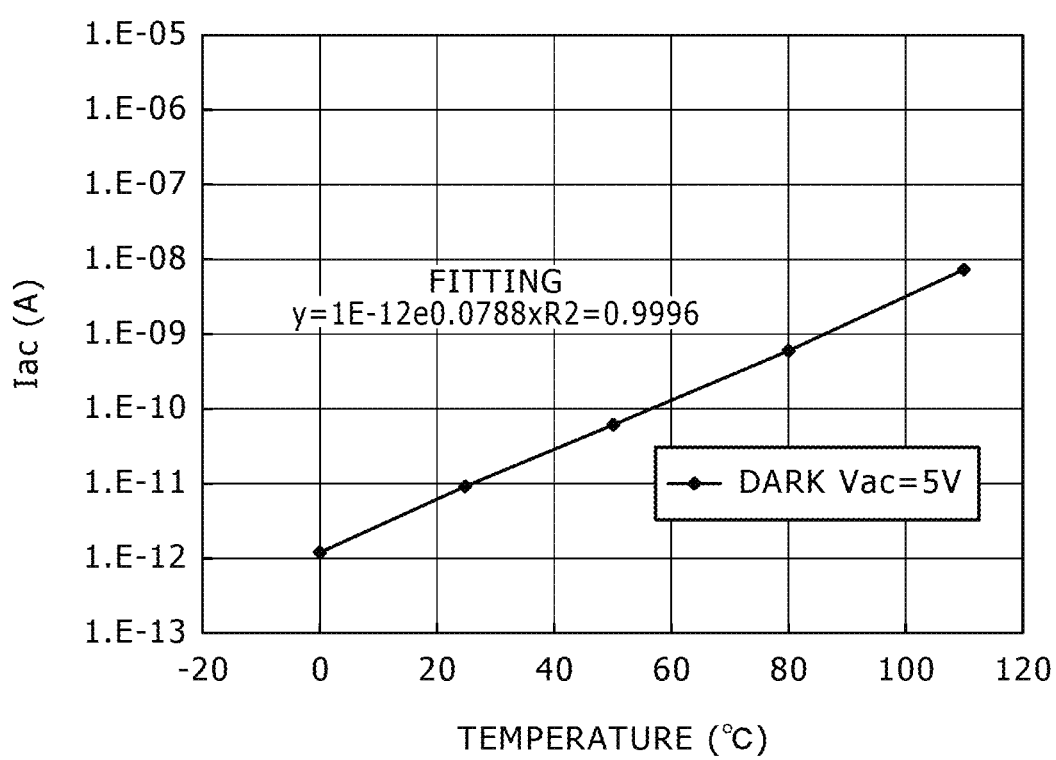
FIG. 24 is a graph showing the dependence of dark current on temperature.

FIG. 24 is a graph showing the dependence of dark current on temperature.

This characteristic can be used to determine temperature from the detected current.

Figure 25:
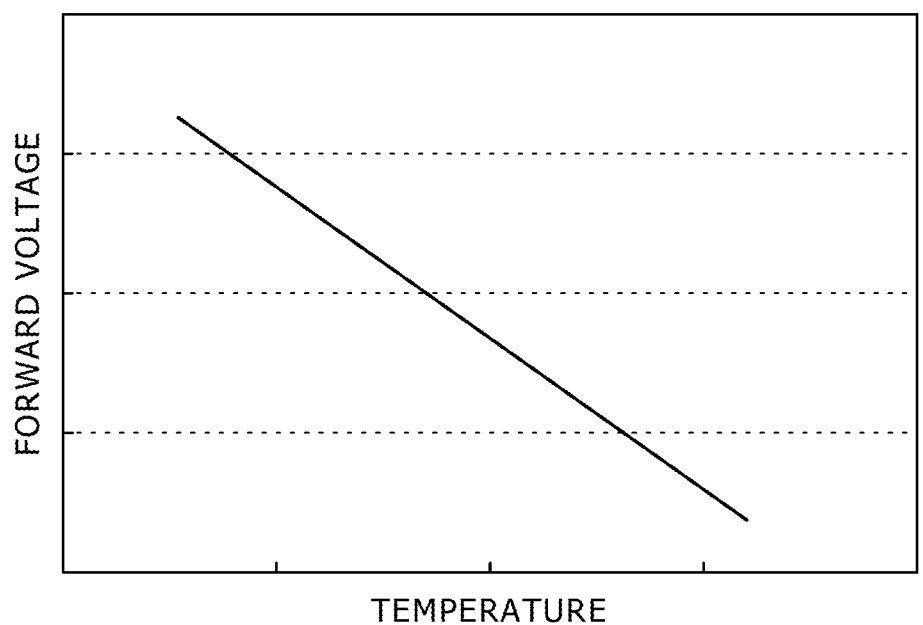
FIG. 25 is a graph showing how temperature depends on the forward voltage of the PIN diode which is produced when the PIN diode is given a certain forward current.

When the PIN diode D211 is given a certain forward current $I_{det}$, it produces a forward voltage which is related with temperature as shown in FIG. 25.

That is, the forward voltage changes linearly with temperature and hence the forward voltage of the temperature sense line TSL connected to the PIN diode D211 gives the information about temperature.

The following is a description of the fluorescence detecting matrix device.

<Fluorescence Detecting Matrix Device>

Figure 26:
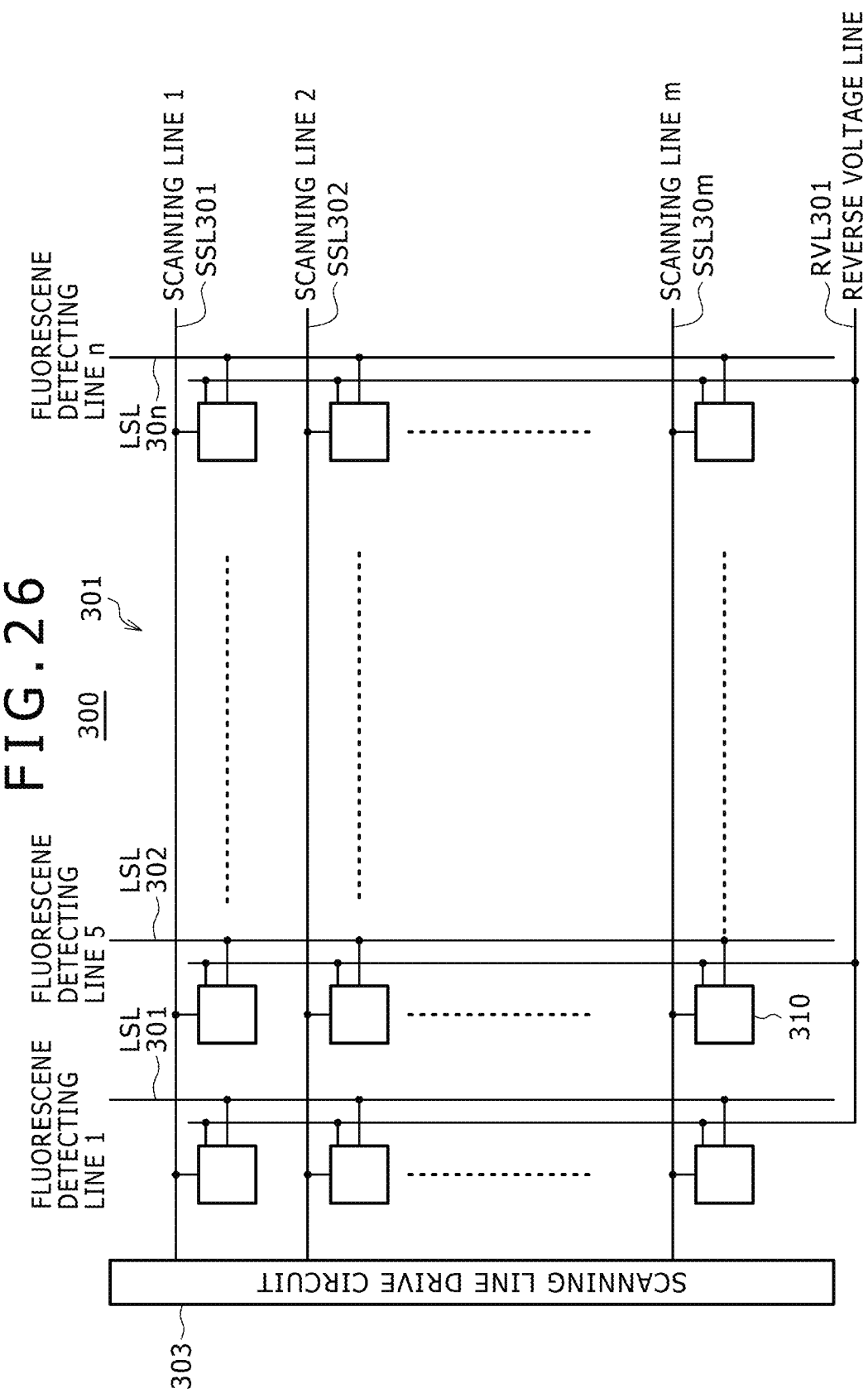
FIG. 26 is a schematic diagram showing the structure of the fluorescence detecting matrix device according to the embodiment of the present invention.

FIG. 26 is a schematic diagram showing the structure of the fluorescence detecting matrix device according to the embodiment of the present invention.

The fluorescence detecting matrix device 300 shown in FIG. 26 consists of the cell array 301 of fluorescence detecting units 310 arranged in an m×n matrix pattern, the scanning line driving circuit (WSDRV) 303, the reverse voltage line RVL301, the fluorescence detecting lines LSL301 . . . LSL30n, and the scanning lines SSL301 . . . SSL30m which select the detecting unit 310 and transfer the detecting signal from the fluorescence detecting unit 310 to the fluorescence detecting lines LSL301 . . . LSL30n.

Figure 27:
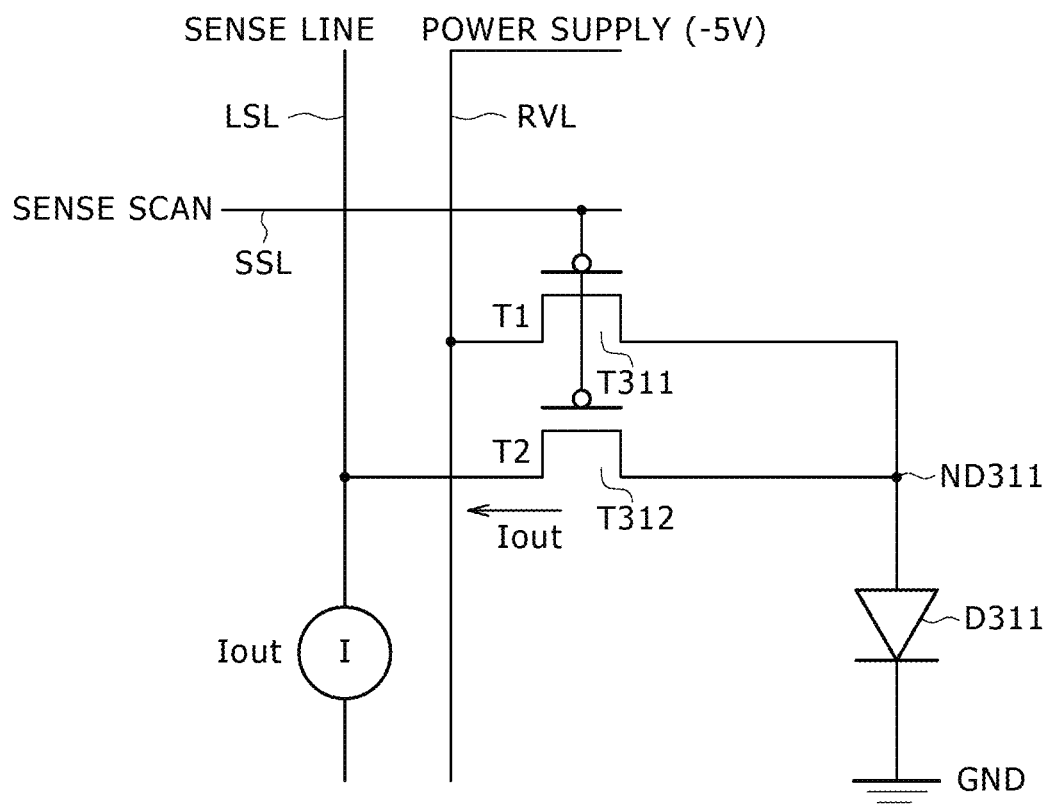
FIG. 27 is a circuit diagram showing the structure of the fluorescence detecting unit according to the embodiment of the present invention.

FIG. 27 is a circuit diagram showing the structure of the fluorescence detecting unit according to the embodiment of the present invention.

The fluorescence detecting unit 310 shown in FIG. 27 consists of the PIN diode D311, the p-channel transistors T311 and T312 which function as switches, and the node ND311.

The PIN diode D311 has its anode connected to the node D311 and its cathode connected to the ground potential GND.

The transistor T311 has its source and drain connected to the node ND311 and the reverse voltage line RVL, respectively. The transistor T312 has its source and drain connected to the node DN311 and the fluorescence sense line LSL.

The transistors T311 and T312 have their gates connected in common to the scanning line SSL.

The transistors T311 and T312 turn on or off when the scanning line SSL is at a low level or at a high level, respectively.

The fluorescence detecting unit 310 work in the following way.

When the reverse voltage line RVL is connected to the negative voltage source and the scanning line SSL is at a low level, the PIN diode D311 is reverse-biased by the negative voltage applied to the reverse voltage line RVL, and the reverse current IR flows.

This reverse current $I_{out}$ is detected by the fluorescence detecting line LSL. In this way fluorescence is detected.

The following is a description of the heater temperature detecting matrix device.

<Heater Temperature Detecting Matrix Device>

Figure 28:
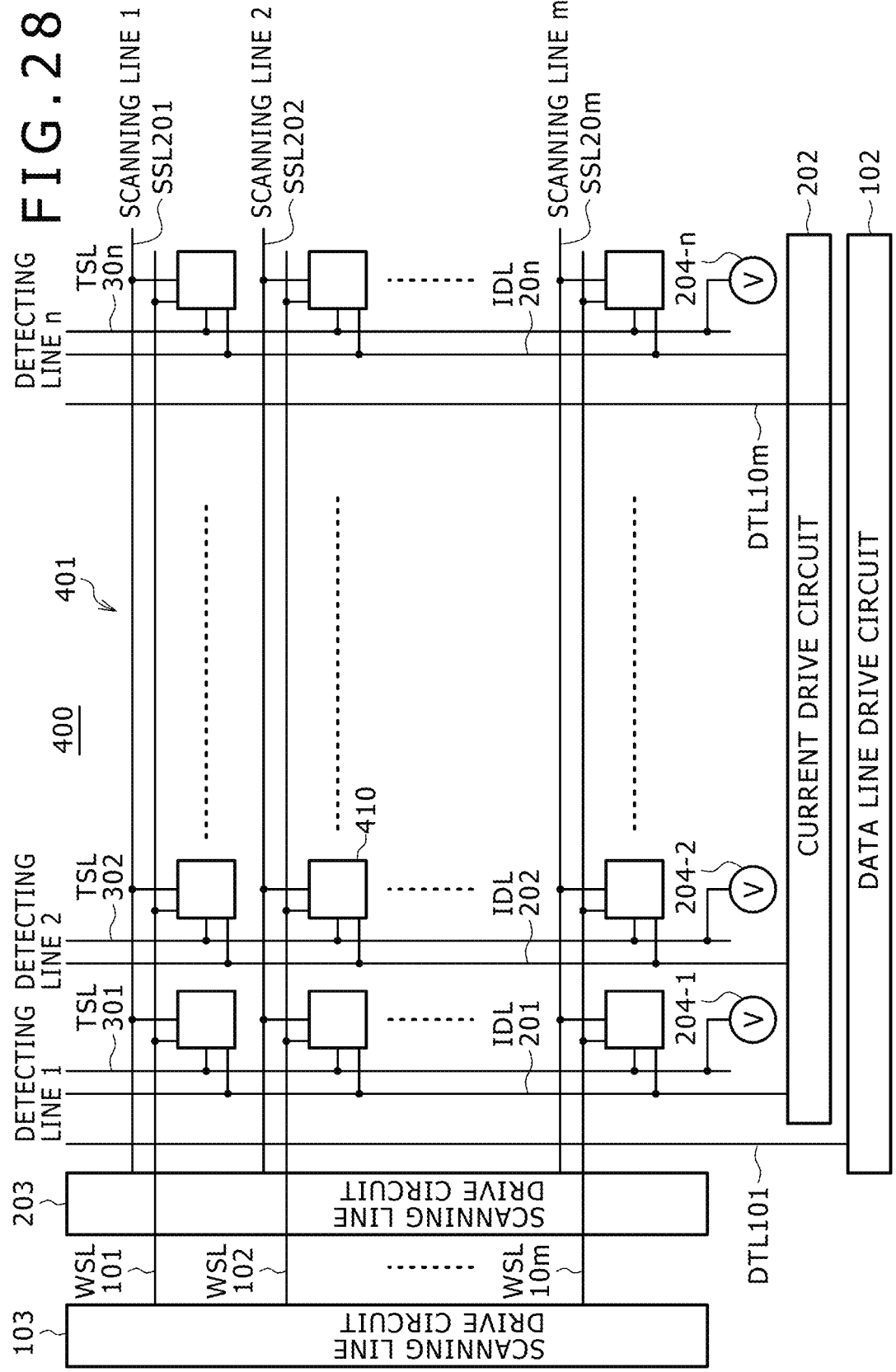
FIG. 28 is a schematic diagram showing the structure of the heater temperature detecting matrix device according to the embodiment of the present invention.

FIG. 28 is a schematic diagram showing the structure of the heater temperature detecting matrix device according to the embodiment of the present invention.

The heater temperature detecting matrix device 400 shown in FIG. 28 is a combination of the heater matrix device 100 shown in FIG. 8 and the temperature detecting matrix device 200 shown in FIG. 22. Therefore, the same symbols are applied to those components in FIG. 28 which are equivalent to those components in FIGS. 8 and 22, for easy understanding.

The heater temperature detecting matrix device 400 shown in FIG. 28 includes the cell array 401 of heater temperature detecting units 410 arranged in an m×n matrix pattern, the data line driving circuit (DTDRV) 102, the scanning line driving circuit (WSDRV) 103, the data lines DTL101 . . . DTL10m that supply information about the amount of heat generation to the heater unit 110, the scanning lines WSL101 . . . WSL10m which select the heater unit 110, write information about the amount of heat generation, and flow current in response to the written information about the amount of heat generation, the current driving circuit (IDRV) 202, the scanning line driving circuit (WSDRV) 203, the voltage detectors (V) 204-1 . . . 204-n, the current drive lines IDL201 . . . IDL20m, the temperature sense lines TSL201 . . . TSL20m, and the scanning lines SSL201 . . . SSL20m which select the temperature detecting unit 210 and transfer the detection signal of the temperature detecting unit 210 to the temperature detecting lines TSL201 . . . TSLL20m.

Figure 29:
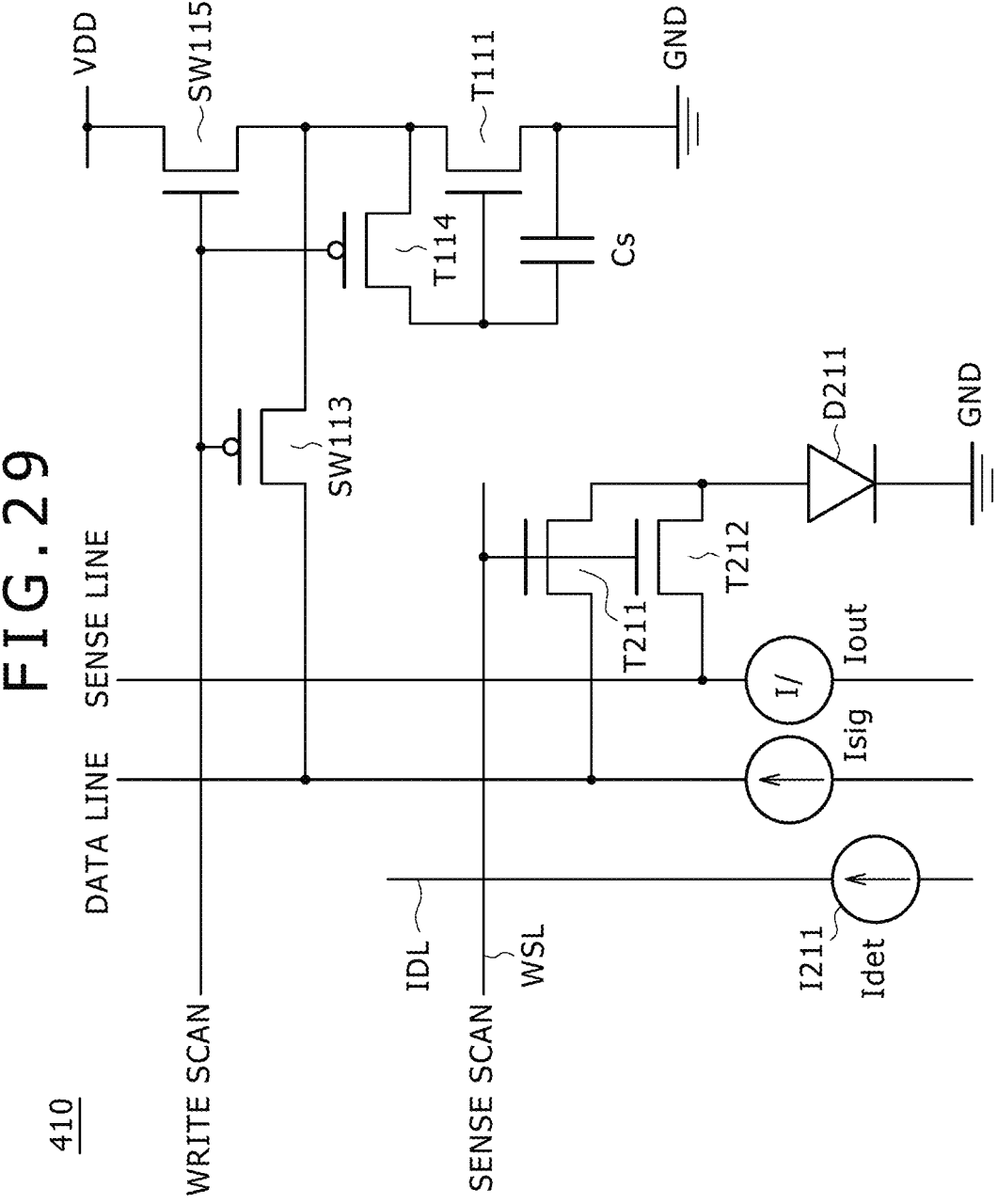
FIG. 29 is a circuit diagram showing the structure of the heater temperature detecting unit according to the embodiment of the present invention.

FIG. 29 is a circuit diagram showing the structure of the heater temperature detecting unit according to the embodiment of the present invention.

The heater temperature detecting unit 410 shown in FIG. 29 includes the heater unit shown in FIG. 16 and the temperature detecting unit 210 shown in FIG. 23.

Therefore, the same symbols are applied to those components in FIG. 29 which are equivalent to those components in FIGS. 8 and 23, for easy understanding.

The heater temperature detecting matrix device 400 shown in FIG. 28 senses the amount of actual heat generation after written as information about the amount of heat generation by current copier, so that it is capable of controlling and correcting the temperature by sensing dark current by means of the PIN diode for current copier and the written amount of information about the amount of heat generation.

In this case, the PIN diode D211 detects temperature by relation between the current of the heater unit 110 and the voltage in response to current flowing through the PIN diode of the temperature detecting unit 210.

Figure 30:
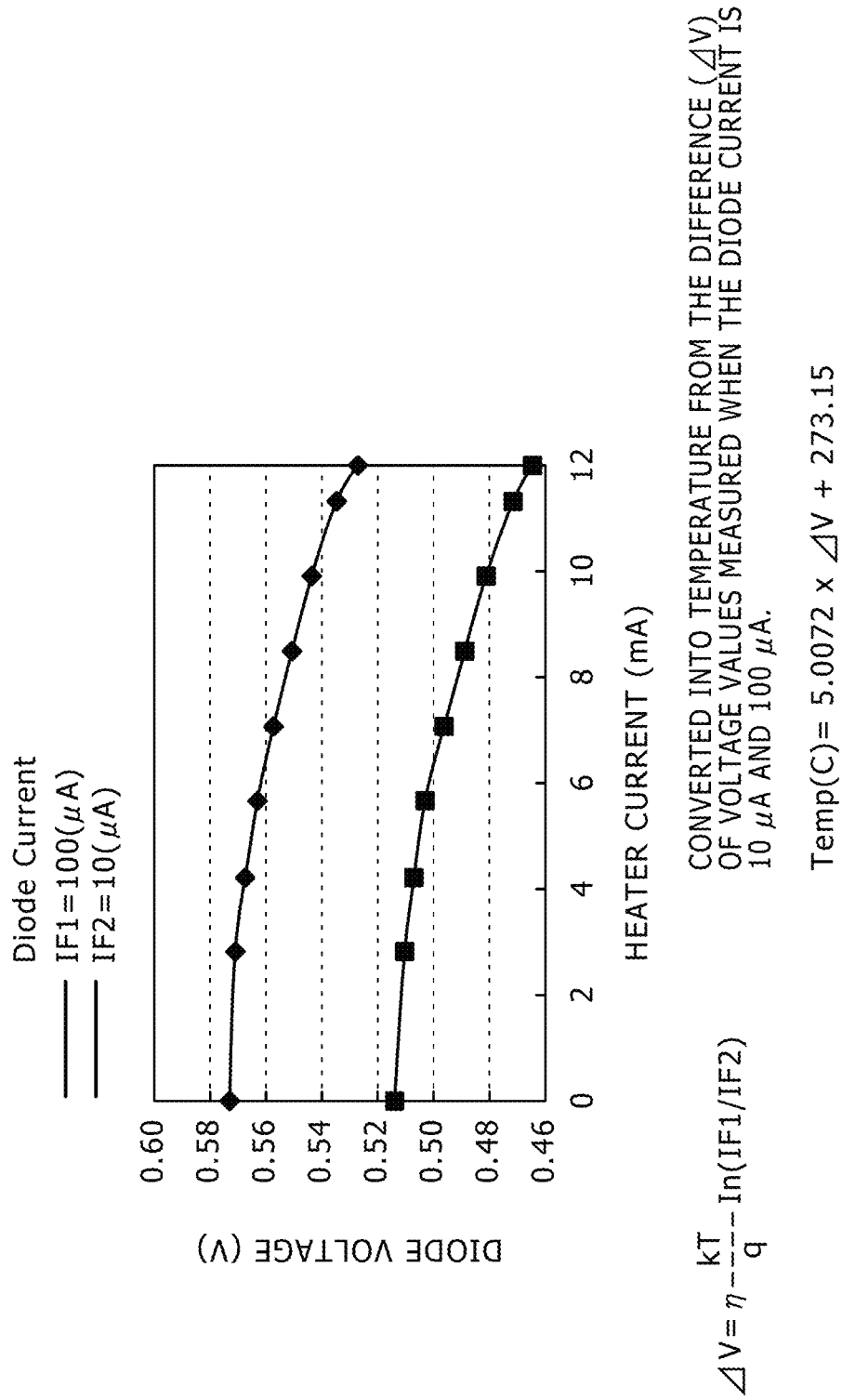
FIG. 30 is a graph showing the relation between the current of the heater unit and the voltage detected in response to current flowing through the PIN diode of the temperature detecting unit.

FIG. 30 is a graph showing the relation between the current of the heater unit and the voltage detected in response to current flowing through the PIN diode of the temperature detecting unit.

In FIG. 30, the abscissa represents the heater current and the ordinate represents the voltage of the diode.

In FIG. 30, IF1 denotes the voltage corresponding to the diode current of 10 μA, and IF2 denotes the voltage corresponding to the diode current of 100 μA.

Temperature can be obtained (by conversion) from the difference in voltage given by the following equation when the diode current is 10 μA and 100 μA.

[Equation 6]

$$\Delta V = \eta(kT/q)\ln(IF1/IF2)$$

$$\text{Temp}(C) = 5.0072 \times \Delta V + 273.15 \quad (6)$$

The following is a description of the temperature fluorescence detecting matrix device.

<Temperature Fluorescence Detecting Matrix Device>

Figure 31:
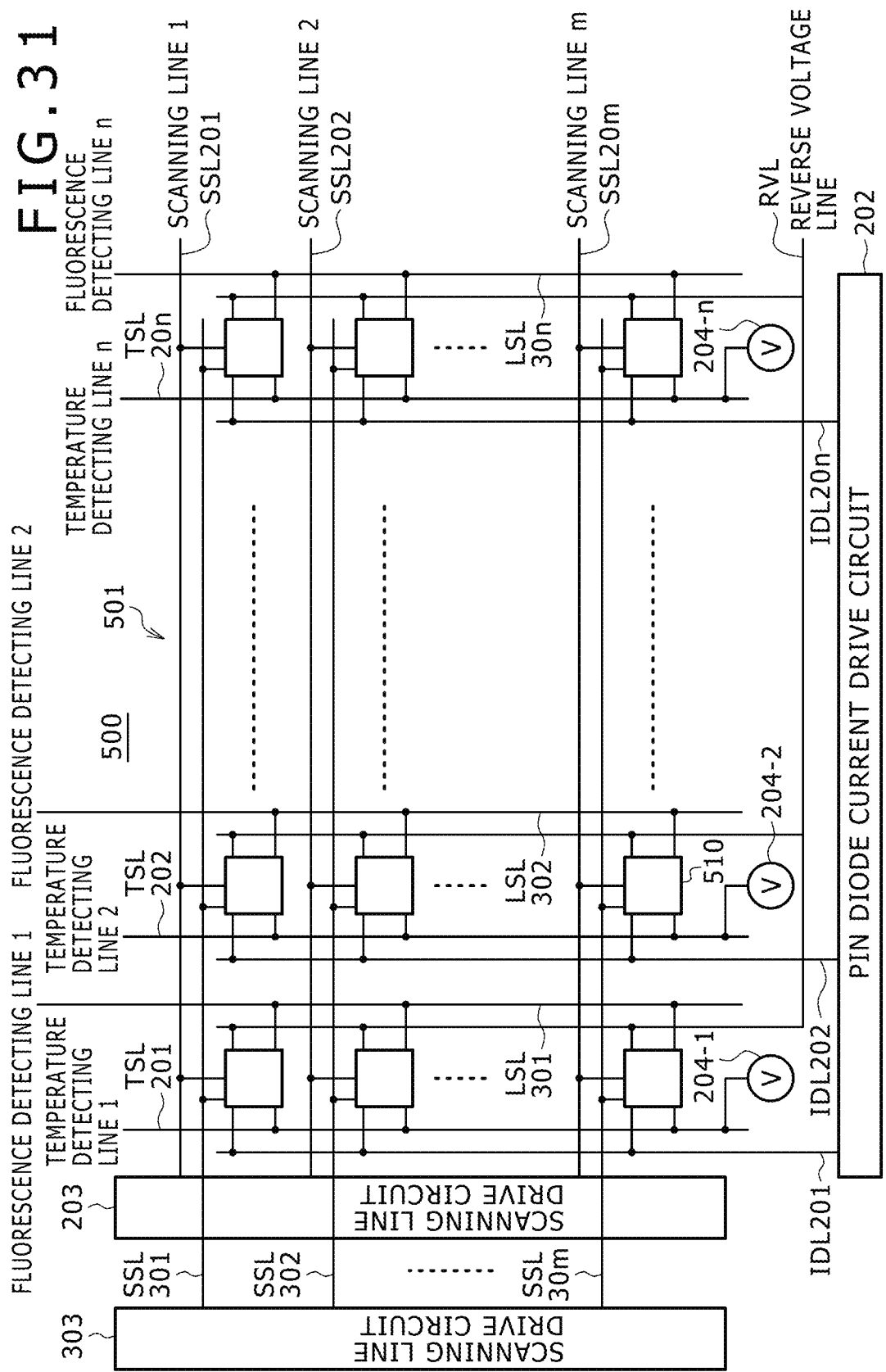
FIG. 31 is a schematic diagram showing the structure of the temperature fluorescence detecting matrix device according to the embodiment of the present invention.

FIG. 31 is a schematic diagram showing the structure of the temperature fluorescence detecting matrix device according to the embodiment of the present invention.

The temperature fluorescence detecting matrix device 500 shown in FIG. 31 is a combination of the temperature detecting matrix device 200 shown in FIG. 22 and the fluorescence detecting matrix device 300 shown in FIG. 26. Therefore, the same symbols are applied to those components in FIG. 31 which are equivalent to those components in FIGS. 22 and 26, for easy understanding.

The temperature fluorescence detecting matrix device 500 shown in FIG. 31 consists of the cell array 501 of temperature fluorescence detecting units 510 arranged in an m×n matrix pattern, the current driving circuit (IDRV) 202, the scanning line driving circuit (WSDRV) 203, the voltage detectors (V) 204-1 ... 204-n, the current driving lines IDL201 ... IDL20m, the temperature sense lines TSL-201 ... TSL20m, the scanning lines SSL201 ... SSL20m which select the detecting unit 210 and transfer the detected signals of the temperature detecting unit 210 to the temperature sense lines TSL201 ... TSL20m, the scanning lines SSI301 ... SSL30n to select the fluorescence detecting unit 210, the scanning line driving circuit (WSDRV) 303, the reverse voltage line RVL301, and the fluorescence detecting lines LSL301 ... LSL30n.

Figure 32:
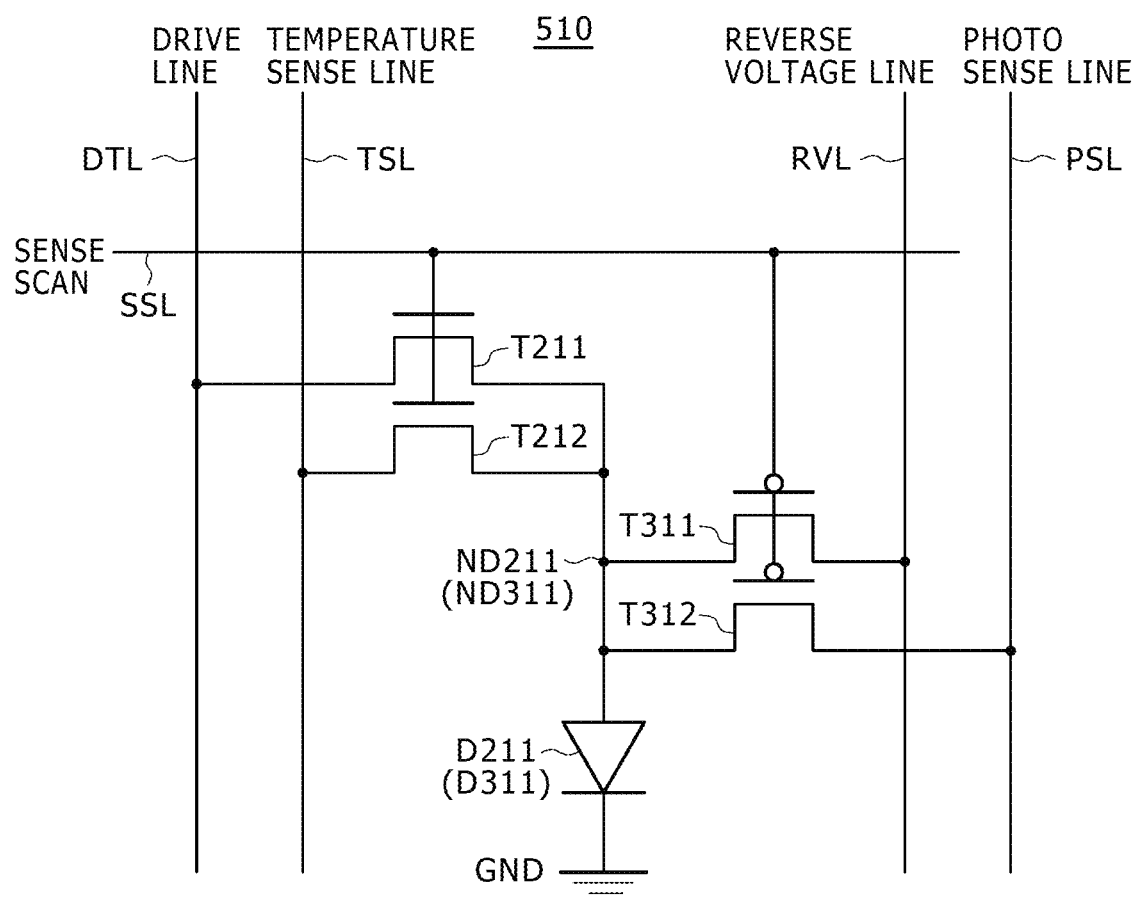
FIG. 32 is a circuit diagram showing the structure of the temperature fluorescence detecting unit according to the embodiment of the present invention.

FIG. 32 is a circuit diagram showing the structure of the temperature fluorescence detecting unit according to the embodiment of the present invention.

The temperature fluorescence detecting unit 510 shown in FIG. 32 is a combination of the PIN diode D211 and the node ND211 of the temperature detecting unit 210 shown in FIG. 23 and the PIN diode D311 and the node ND311 of the fluorescence detecting unit 310 shown in FIG. 27. Therefore, the same symbols are applied to those components in FIG. 32 which are equivalent to those components in FIGS. 23 and 27, for easy understanding.

The temperature fluorescence detecting unit 510 includes one PIN diode D211 (D311), two n-channel transistors T211 and T212, and two p-channel transistors T311 and T312.

FIG. 33 shows how the temperature fluorescence detecting unit according to the embodiment of the present invention performs temperature detection and fluorescence detection depending on whether the transistors as switches turn on and off.

The scanning line SSL receives the switch signal which periodically changes from high level to low level and vice versa. The n-channel transistors T211 and T212 and the p-channel transistors T311 and T312 are connected in common to the scanning line SSL.

Thus, when the scanning line SSL is at a high level, the transistors T211 and T212 turn on and the transistors T311 and T312 turn off.

On the other hand, when the scanning line SSL is at a low level, the transistors T211 and T212 turn off and the transistors T311 and T312 turn on.

Figure 34:
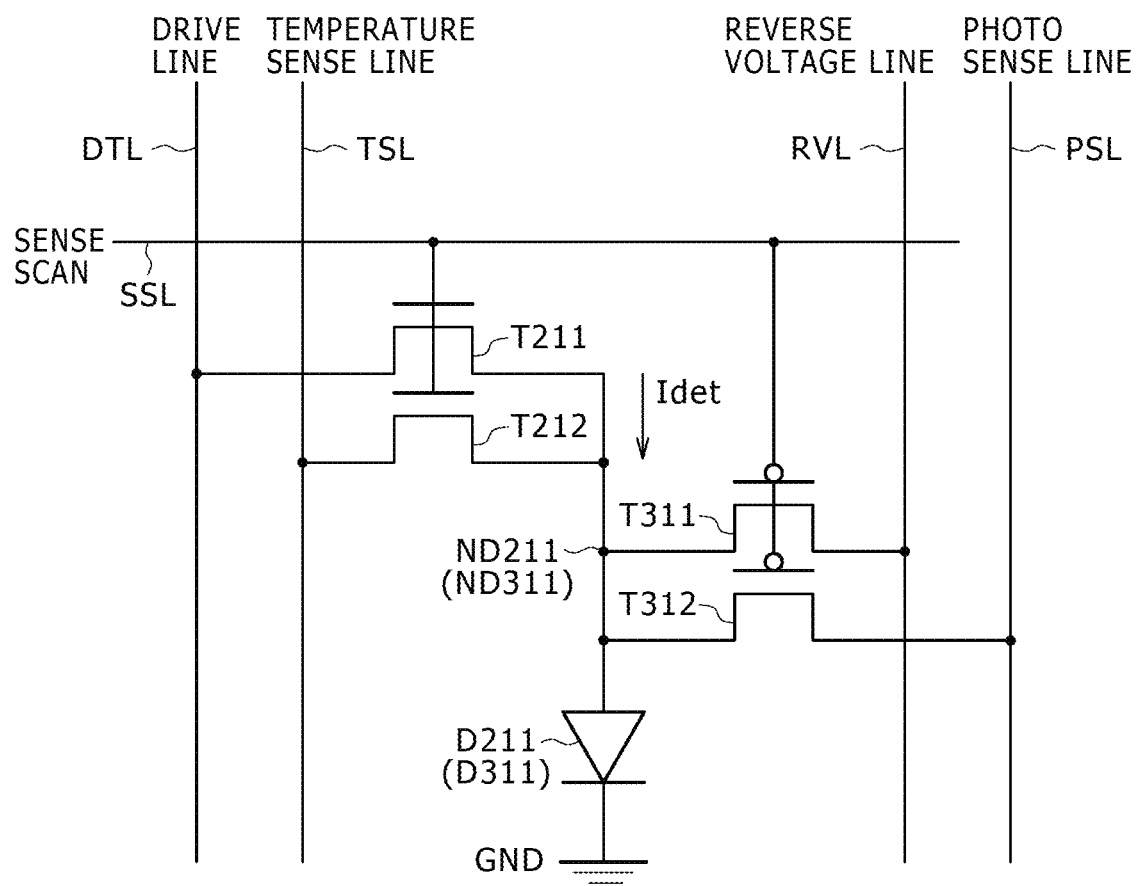
FIG. 34 is a diagram illustrating how temperature detection is performed by the temperature fluorescence detecting unit according to the embodiment of the present invention.
Figure 35:
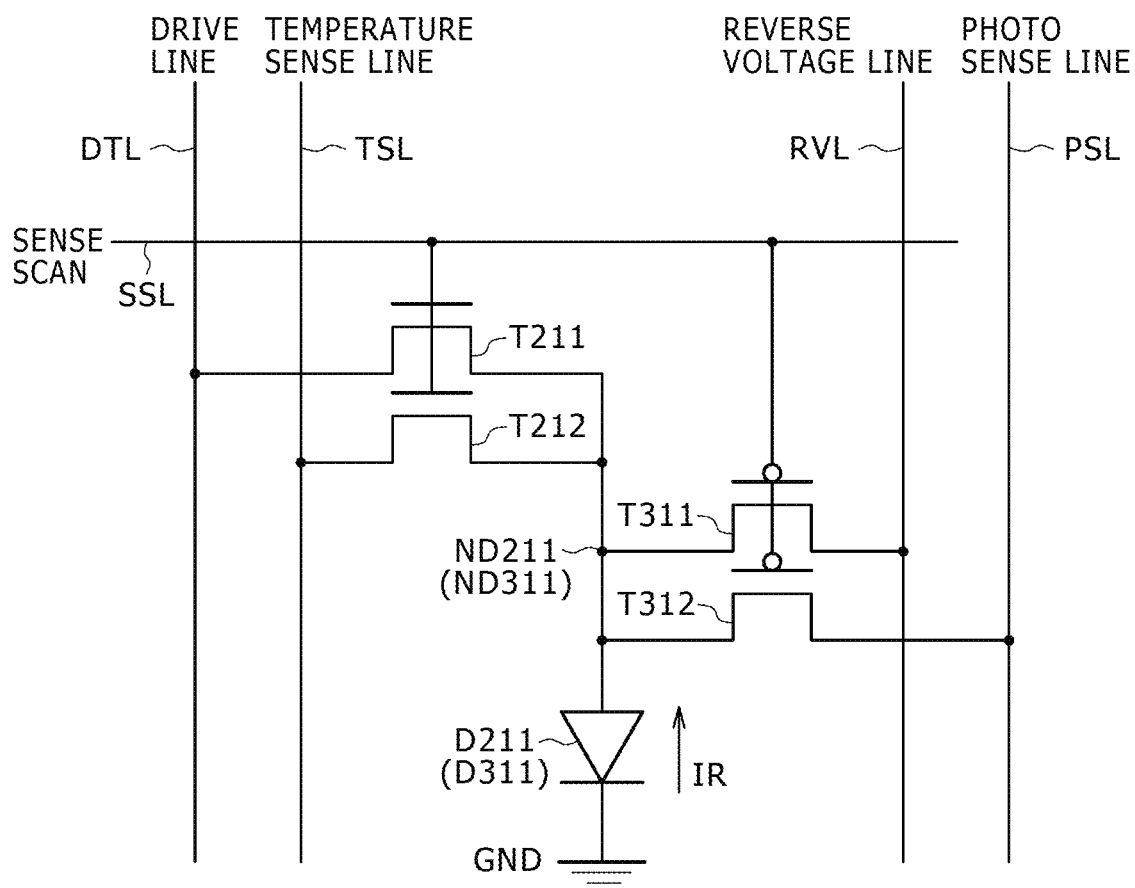
FIG. 35 is a diagram illustrating how fluorescence detection is performed by the temperature fluorescence detecting unit according to the embodiment of the present invention.

FIG. 34 is a diagram illustrating how temperature detection is performed by the temperature fluorescence detecting unit according to the embodiment of the present invention. FIG. 35 is a diagram illustrating how fluorescence detection is performed by the temperature fluorescence detecting unit according to the embodiment of the present invention.

At the time of temperature detection, connection is made with the current source I211 that supplies current $I_{det}$ to the current drive line IDL. When the scanning line SSL is at a high level, a forward current $I_{det}$ flows from the current source I211 connected to the current drive line IDL to the PIN diode D211. At the same time, the voltage detector 204 is connected to the temperature sense line TSL so that the forward voltage that occurs in the PIN diode D211 is detected.

There is a relationship as shown in FIG. 26 between the temperature and the forward voltage that occurs across the PIN diode D211 when a certain forward current $I_{det}$ flows through the PIN diode D211.

In other words, there is a linear relationship between the forward voltage and the temperature, and the temperature information can be obtained by detecting the forward voltage of the temperature sense line TSL connected to the PIN diode D211.

At the time of fluorescence detection, the negative voltage source is connected to the reverse voltage line RVL, so that, when the scanning line SSL is at a low level, the PIN diode D311 is reverse-biased by the negative voltage applied to the reverse voltage line RVL and the reverse current IR flows as shown in FIG. 35.

This reverse current $I_{out}$ is detected through the fluorescence detecting line LSL to detect fluorescence.

The temperature fluorescence matrix device 500 shown in FIG. 31 works in such a way that the scanning line driving circuit 203 put the scanning lines SSL201 ... SSL20m sequentially at a high level and, in synchronism with it, the current driving line driving circuit 202 applies a constant current to the current driving lines IDL201 ... IDL20n and the voltage of the temperature sense line TSL201 ... TSL20n is monitored, so that the temperature information can be detected row by row for each PIN diode D211.

After temperature detection is completed, the scanning lines are sequentially put to a low level, so that each PIN diode D211 is given a reverse voltage and the fluorescence information can be detected row by row for each PIN diode D211.

In this way each unit detects temperature and fluorescence alternately.

Figure 36:
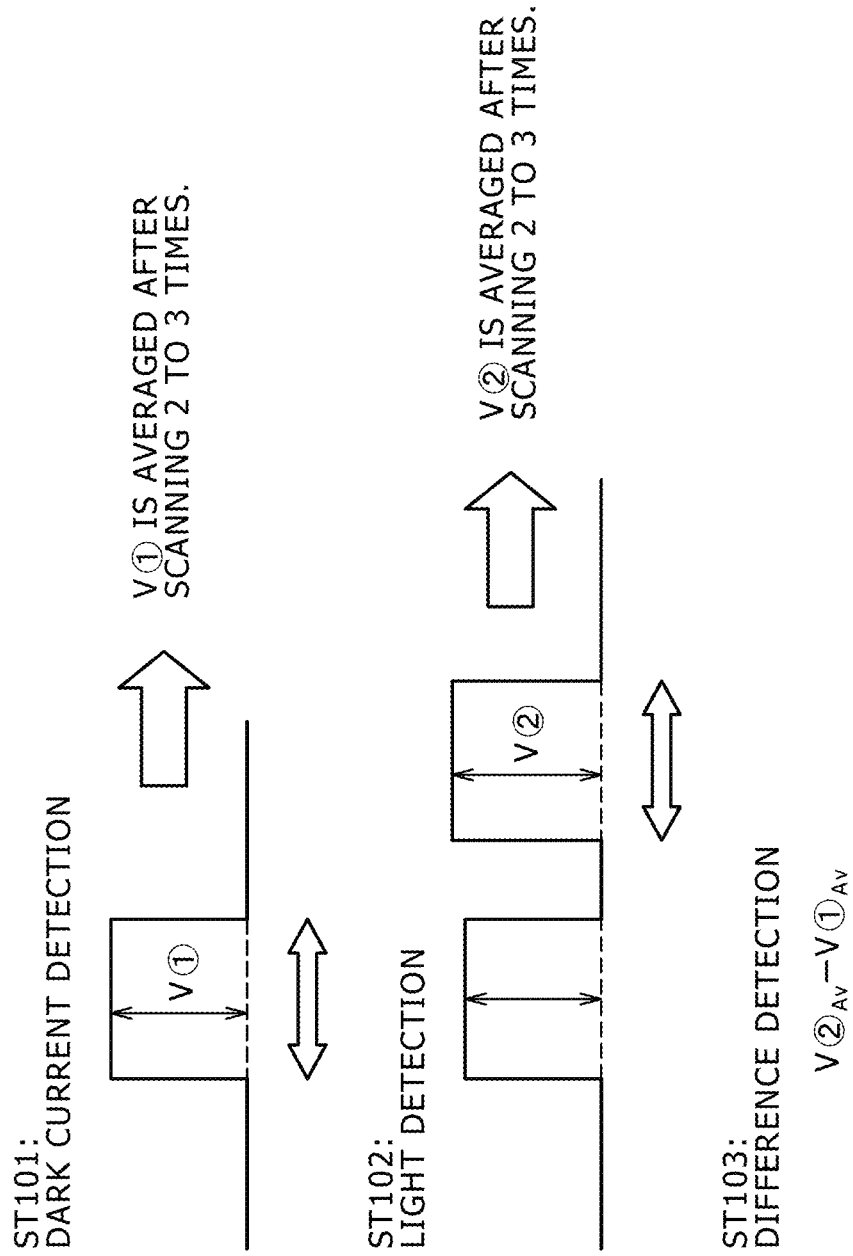
FIG. 36 is a diagram illustrating the fluorescence detection.

Incidentally, the fluorescence detection is accomplished in such a way that the dark current of the PIN diode D2111 (D311) is detected first, the detected value is binarized to give V1, and an average of V1 is obtained after scanning two or three times, as shown in FIG. 36. (ST101)

Then, the fluorescence detection mentioned above is accomplished, the detected value is binarized to give V2, and an average of V2 is obtained after scanning two or three times. (ST102)

The difference between V2 and V1 is obtained. (T103)

This procedure allows accurate fluorescence detection.

The following is a description of the heater temperature fluorescence detecting matrix device.

<Heater Temperature Fluorescence Detecting Matrix Device>

Figure 37:
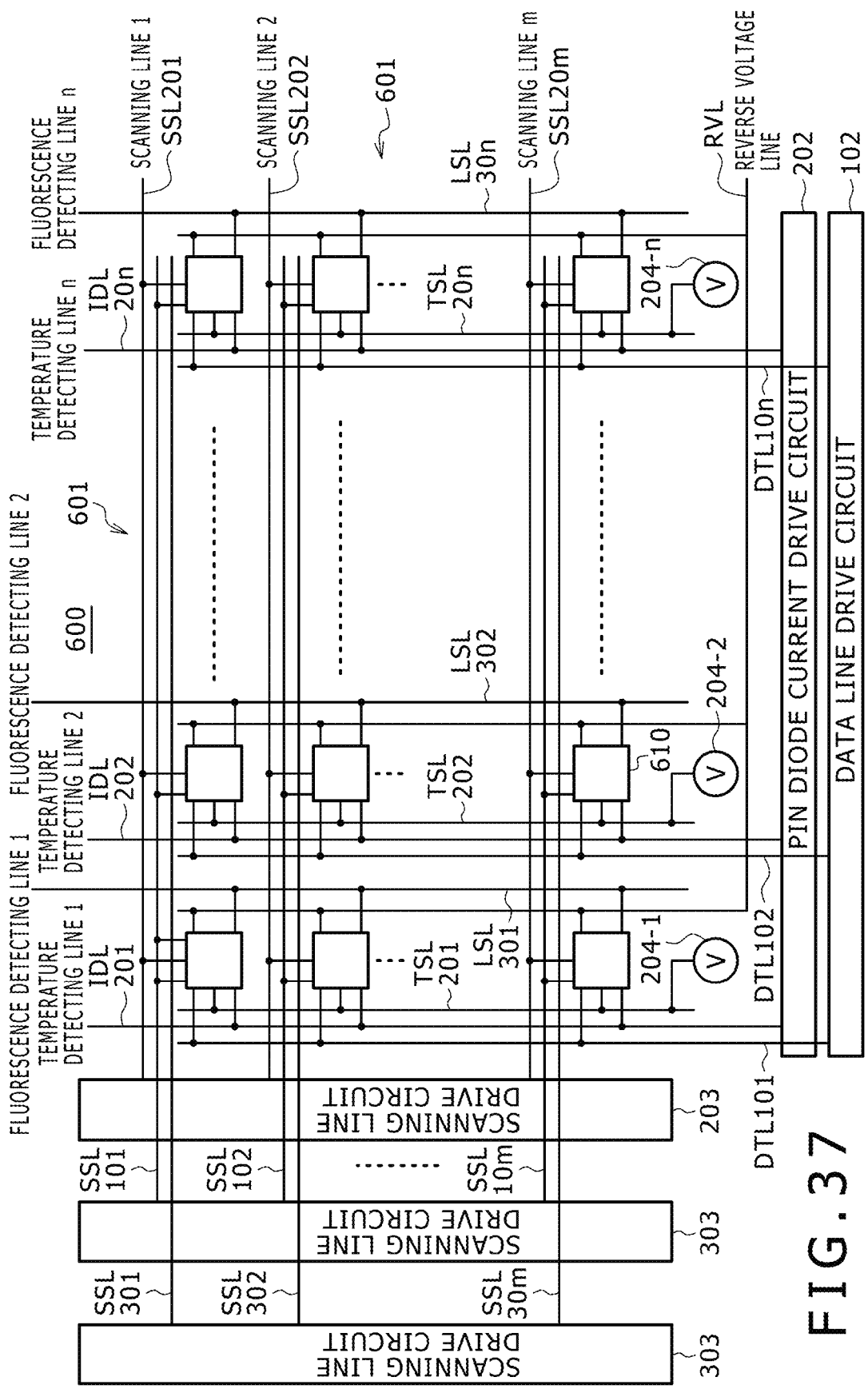
FIG. 37 is a schematic diagram showing the structure of the heater temperature fluorescence detecting matrix device according to the embodiment of the present invention.

FIG. 37 is a schematic diagram showing the structure of the heater temperature fluorescence detecting matrix device according to the embodiment of the present invention.

The heater temperature fluorescence detecting matrix device 600 shown in FIG. 37 is a combination of the heater matrix device 100 shown in FIG. 8, the temperature detecting matrix device 200 shown in FIG. 23, and the fluorescence detecting matrix device 300 shown in FIG. 28. Therefore, the same symbols are applied to those components in FIG. 37 which are equivalent to those components in FIGS. 8, 23, and 26, for easy understanding.

The heater temperature fluorescence detecting matrix device shown 600 shown in FIG. 37 includes the cell array 601 of heater temperature fluorescence detecting units 610 arranged in an m×n matrix pattern, the data driving circuit (DTDRV) 102, the scanning line driving circuit (WSDRV) 103, the data lines DTL101 . . . DTL10m that give the information about the amount of heat generation to the heater unit 110, the scanning lines WSL101 . . . WSL10m which select the heater unit 210, write the information about the amount of heat generation, and flow current in response to the information about the amount of heat generation which has been written, the current driving circuit (IDRV) 202, the scanning line driving circuit (WSDRV) 203, the voltage detectors (V) 204-1 . . . 204-n, the current drive lines IDL201 . . . IDL20m, the temperature sense lines TSL201 . . . TSL20m, the scanning liens SSL201 . . . SSL20m which select the temperature detecting unit 210 and transfer the signals detected by the temperature detecting unit 210 to the temperature detecting lines TSL201 . . . TSL20n, the current driving circuit (IDTC) 302, and scanning line driving circuit (WSDRV) 303, the reverse voltage line RVL301, and the fluorescence detecting lines LSL301 . . . LSL30m.

The foregoing structure may be modified such that the data line driving circuit 102 and the current driving circuit 202 function in common.

In this case the data line DTL and the temperature sense line TSL function in common.

FIG. 38 is a circuit diagram showing the structure of the heater temperature fluorescence detecting unit according to the embodiment of the present invention.

The heater temperature fluorescence detecting unit 610 shown in FIG. 38 consists of the heater unit 110 shown in FIG. 16 and the temperature fluorescence detecting unit 510 shown in FIG. 32. Therefore, the same symbols are applied to those components in FIG. 38 which are equivalent to those components in FIGS. 16 and 22, for easy understanding.

In this embodiment, the data line DTL and the temperature detecting line TSL function in common.

The heater temperature fluorescence detecting matrix device 600 shown in FIG. 37 senses the amount of actual heat generation by using current copier after writing as the information about the amount of heat generation, so that it senses the dark current by the PIN diode for the written information about the amount of heat generation for current copier. In this way it is possible to correct the temperature control.

And, by sensing the current that occurs when fluorescence is received, it is possible to detect the reaction of amplification.

To be specific, it is possible to detect in real time the reaction of amplification in terms of the amount of fluorescence by the PIN diode D211 which is the temperature detecting device by using the detection of fluorescence as the signal of detection of amplification reaction in the stage of feeding back in real time the control of heat generation by the circuit composed of the current copier (heater unit) and the temperature detecting unit.

As mentioned above, the heat control matrix device applicable to the reactor for DNA amplification produces the following effects.

It is possible to control the temperature of individual wells by active matrix control and hence it is possible to perform comprehensive gene analysis in a short time.

It is possible to obtain the accurate amount of heat generation by feedback mechanism owing to the temperature detecting circuit even though the semiconductor elements vary in characteristics or have temperature characteristics, and this leads to efficient PCR control.

It is possible to obtain the accurate amount of heat generation by feedback mechanism owing to the temperature detecting circuit even though the semiconductor elements change with time in characteristics, and this leads to the highly reliable PCR control device.

Having the function to suspend the action of heat generation by each scanning line, it is possible to lower the temperature easily and rapidly, and being able to control the duration of heating, it is easy to control minute heat generation.

When the information about heat generation is written, it accurately senses the actual amount of heat generation and corrects the written amount of heat generation, so that it offers the accurate amount of heat generation.

It is possible to detect fluorescence as the signal of amplification reaction by using the circuit identical with the temperature detecting circuit for temperature sensing.

Thus, the reactor according to this embodiment permits temperature control to be performed on wells accurately and individually. This reactor will be used in any application area where reactions with accurate temperature control are required. It is suitable particularly for the PCR device for nucleic acid amplification reaction.

The present application contains subject matter related to that disclosed in Japanese Priority Patent Application JP 2008-105840 filed in the Japan Patent Office on Apr. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reactor comprising:
   a plurality of reaction regions including a plurality of reaction wells;
   a plurality of heater units, each heater unit comprising a semiconductor heat generating element and a semiconductor temperature detecting element, wherein each reaction well includes a corresponding heater unit configured for independent temperature control, and wherein each said temperature detecting element has a heat conduction region enclosed and separated from other temperature detecting elements by a thermally conductive metal thin film constructed and arranged to diffuse heat from the semiconductor heat generating element to the semiconductor temperature detecting element;

a cooling part adapted to absorb heat and a radiator adapted to release the absorbed heat;

a data line driving circuit configured to provide the plurality of heater units information about an amount of heat generation; and a scanning line driving circuit configured to select a subset of heater units, write information about the amount of heat generation to the subset of heater units, and supply current to the subset of heater units in response to the written information about the amount of heat generation.

2. The reactor as defined in claim 1, wherein said semiconductor temperature detecting element is a diode or a PIN diode.

3. The reactor as defined in claim 1, wherein said semiconductor heat generating element is a thin film transistor.

4. The reactor as defined in claim 1, wherein said metal thin film is a wiring layer.

5. The reactor as defined in claim 1, wherein said reaction region is a polymerase chain reaction region for nucleic acid amplification.

6. The reactor as defined in claim 5, wherein said reactor further comprises a fluorescence detector that detects fluorescence induced by irradiation with exciting rays.

7. The reactor as defined in claim 1, wherein each heater unit comprises a transistor, a first switch element and a second switch element, wherein the transistor is electrically connected to the first switch element and the second switch element.

8. The reactor as defined in claim 7, wherein each heater unit comprises a third switch element electrically connected to the transistor.

9. The reactor as defined in claim 7, wherein each heater unit comprises a capacitor electrically connected to the transistor and the first switch element.

* * * * *